(12) United States Patent
Ohyabu et al.

(10) Patent No.: US 11,691,693 B2
(45) Date of Patent: Jul. 4, 2023

(54) FRONT SPROCKET ASSEMBLY FOR HUMAN-POWERED VEHICLE

(71) Applicant: SHIMANO INC., Sakai (JP)

(72) Inventors: Kohei Ohyabu, Sakai (JP); Tomohiro Noma, Sakai (JP); Hiroyuki Torii, Sakai (JP)

(73) Assignee: SHIMANO INC., Sakai (JP)

( * ) Notice: Subject to any disclaimer, the term of this patent is extended or adjusted under 35 U.S.C. 154(b) by 156 days.

(21) Appl. No.: 17/332,942

(22) Filed: May 27, 2021

(65) Prior Publication Data

US 2022/0379997 A1 Dec. 1, 2022

(51) Int. Cl.
*B62M 9/10* (2006.01)
*B62M 9/136* (2010.01)

(52) U.S. Cl.
CPC ............ *B62M 9/105* (2013.01); *B62M 9/136* (2013.01)

(58) Field of Classification Search
CPC .......... B62M 9/105; B62M 9/10; B62M 9/12; B62M 2009/007; B62M 9/136; F16H 55/30
USPC ......................................................... 474/160
See application file for complete search history.

(56) References Cited

U.S. PATENT DOCUMENTS

| | | | | |
|---|---|---|---|---|
| 5,738,603 A * | 4/1998 | Schmidt | .................... | B62M 9/10 474/158 |
| 5,971,878 A * | 10/1999 | Leng | ........................ | B62M 9/10 474/160 |
| 6,007,442 A * | 12/1999 | Schmidt | .................... | B62M 9/10 474/122 |
| 6,572,500 B2 * | 6/2003 | Tetsuka | ..................... | B62M 9/10 474/160 |
| 8,550,944 B2 * | 10/2013 | Esquibel | ................... | B62M 9/10 474/160 |
| 8,978,514 B2 * | 3/2015 | Shiraishi | ................. | B62M 9/105 74/594.2 |
| 9,457,870 B2 * | 10/2016 | Sugimoto | .............. | B62M 9/105 |
| 9,701,364 B2 * | 7/2017 | Sugimoto | .............. | B62M 9/105 |
| 9,963,196 B2 * | 5/2018 | Sugimoto | ............. | F16H 55/303 |
| 10,155,566 B2 * | 12/2018 | Sugimoto | .............. | B62M 9/105 |
| 10,507,888 B2 * | 12/2019 | Sugimoto | ................ | B62M 1/36 |
| 10,549,816 B2 * | 2/2020 | Sugimoto | ................ | B62M 9/10 |

(Continued)

FOREIGN PATENT DOCUMENTS

JP 2020-104639 7/2020

*Primary Examiner* — Henry Y Liu
(74) *Attorney, Agent, or Firm* — Mori & Ward, LLP

(57) ABSTRACT

A front sprocket assembly comprises a first sprocket and a second sprocket. The second sprocket includes a second sprocket body and a plurality of second sprocket teeth. At least one tooth of the plurality of second sprocket teeth includes a less chain-interference recess provided to the second axially inwardly facing surface. The less chain-interference recess is configured to reduce interference between the at least one tooth of the plurality of second sprocket teeth and a chain in an upshifting operation in which the chain is shifted from the first sprocket toward the second sprocket. The less chain-interference recess has a radially innermost end positioned radially inwardly from a tooth bottom circle of the plurality of second sprocket teeth. A radial distance radially defined from the tooth bottom circle to the radially innermost end with respect to a rotational center axis is equal to or larger than 1.0 mm.

16 Claims, 22 Drawing Sheets

(56) References Cited

U.S. PATENT DOCUMENTS

| | | | |
|---|---|---|---|
| 10,787,228 B2 | 9/2020 | Minto et al. | |
| 11,203,395 B2 * | 12/2021 | Watarai | F16H 55/30 |
| 2005/0282671 A1 * | 12/2005 | Emura | B62M 9/105 |
| | | | 474/160 |
| 2014/0338494 A1 * | 11/2014 | Sugimoto | B62M 9/10 |
| | | | 474/158 |
| 2016/0339995 A1 * | 11/2016 | Sugimoto | B62M 9/105 |

* cited by examiner

FRONT SPROCKET ASSEMBLY FOR HUMAN-POWERED VEHICLE

BACKGROUND OF THE INVENTION

Field of the Invention

The present invention relates to a front sprocket assembly for a human-powered vehicle.

Discussion of the Background

A human-powered vehicle includes a sprocket assembly configured to be engaged with a chain. The sprocket assembly includes a plurality of sprockets having different outer diameters. The chain may interfere with a sprocket in a shifting operation in which the chain is shifted to the sprocket from another sprocket in the plurality of sprockets. One object of the present disclosure is to make a shifting operation smooth in a front sprocket assembly.

SUMMARY OF THE INVENTION

In accordance with a first aspect of the present invention, a front sprocket assembly for a human-powered vehicle comprises a first sprocket and a second sprocket. The first sprocket has a first axially outwardly facing surface and a first axially inwardly facing surface. The first axially inwardly facing surface is provided on a reverse side of the first axially outwardly facing surface in an axial direction with respect to a rotational center axis of the front sprocket assembly. The first sprocket includes a first sprocket body and a plurality of first sprocket teeth. The plurality of first sprocket teeth extends radially outwardly from a first outer periphery of the first sprocket body in with respect to the rotational center axis. The first sprocket has a first pitch circle diameter. The second sprocket has a second axially outwardly facing surface and a second axially inwardly facing surface. The second axially inwardly facing surface is provided on a reverse side of the second axially outwardly facing surface in the axial direction. The second axially inwardly facing surface is configured to face the first axially outwardly facing surface of the first sprocket in the axial direction in an assembled state of the front sprocket assembly. The second sprocket includes a second sprocket body and a plurality of second sprocket teeth. The plurality of second sprocket teeth extends radially outwardly from a second outer periphery of the second sprocket body with respect to the rotational center axis. The second sprocket has a second pitch circle diameter larger than the first pitch circle diameter. The second sprocket is adjacent to the first sprocket without another sprocket between the first sprocket and the second sprocket in the axial direction. At least one tooth of the plurality of second sprocket teeth includes a less chain-interference recess provided to the second axially inwardly facing surface. The less chain-interference recess is configured to reduce interference between the at least one tooth of the plurality of second sprocket teeth and a chain in an upshifting operation in which the chain is shifted from the first sprocket toward the second sprocket. The at least one tooth of the plurality of second sprocket teeth has a driving surface and a non-driving surface provided on a reverse side of the driving surface in a circumferential direction with respect to the rotational center axis. The less chain-interference recess extends radially inwardly with respect to the rotational center axis in an elongated direction inclining from the driving surface toward an upstream side with respect to a driving rotational direction of the front sprocket assembly. The less chain-interference recess has a radially innermost end positioned radially inwardly from a tooth bottom circle of the plurality of second sprocket teeth. A radial distance radially defined from the tooth bottom circle to the radially innermost end with respect to the rotational center axis is equal to or larger than 1.0 mm.

With the front sprocket assembly according to the first aspect, the less chain-interference recess can reduce interference between the at least one tooth of the plurality of second sprocket teeth and the chain in the upshifting operation. Thus, the less chain-interference recess can make the upshifting operation smooth.

In accordance with a second aspect of the present invention, the front sprocket assembly according to the first aspect is configured so that the radial distance is equal to or larger than 1.3 mm.

With the front sprocket assembly according to the second aspect, the less chain-interference recess can reliably make the upshifting operation smooth.

In accordance with a third aspect of the present invention, the front sprocket assembly according to the first or second aspect is configured so that the radial distance is equal to or smaller than 2.0 mm.

With the front sprocket assembly according to the third aspect, it is possible to ensure adequate strength of the second sprocket body.

In accordance with a fourth aspect of the present invention, the front sprocket assembly according to any one of the first to third aspects is configured so that the first sprocket has a first total tooth number. The second sprocket has a second total tooth number larger than the first total tooth number.

With the front sprocket assembly according to the fourth aspect, the less chain-interference recess can reliably make the upshifting operation smooth.

In accordance with a fifth aspect of the present invention, the front sprocket assembly according to the fourth aspect is configured so that a tooth number difference between the first total tooth number and the second total tooth number is equal to or larger than nine.

With the front sprocket assembly according to the fifth aspect, the tooth number difference can provide a wider gear range of the front sprocket assembly while the less chain-interference recess can make the upshifting operation smooth.

In accordance with a sixth aspect of the present invention, the front sprocket assembly according to the fifth aspect is configured so that the tooth number difference between the first total tooth number and the second total tooth number is equal to or smaller than 20.

With the front sprocket assembly according to the sixth aspect, the tooth number difference can reliably provide a wider gear range of the front sprocket assembly while the less chain-interference recess can make the upshifting operation smooth.

In accordance with a seventh aspect of the present invention, the front sprocket assembly according to any one of the fourth to sixth aspects is configured so that the second total tooth number is equal to or larger than 50.

With the front sprocket assembly according to the seventh aspect, the second total tooth number enables a wider gear range on its top-gear side. Thus, it is possible to provide a drive train having a greater gear ratio.

In accordance with an eighth aspect of the present invention, the front sprocket assembly according to any one of the first to seventh aspects further comprises a shift assist projection at least a part of which is disposed radially inwardly from the non-driving surface of the at least one tooth of the plurality of second sprocket teeth with respect to the rotational center axis.

With the front sprocket assembly according to the eighth aspect, the shift assist projection can make the upshifting operation smooth in the front sprocket assembly having a greater tooth number difference.

In accordance with a ninth aspect of the present invention, the front sprocket assembly according to the eighth aspect is configured so that the radially innermost end of the less chain-interference recess is positioned at a downstream side from the shift assist projection with respect to the driving rotational direction of the front sprocket assembly.

With the front sprocket assembly according to the ninth aspect, it is possible to make the upshifting operation smoother.

In accordance with a tenth aspect of the present invention, the front sprocket assembly according to the eighth or ninth aspect is configured so that the shift assist projection is disposed radially inwardly from the less chain-interference recess with respect to the rotational center axis.

With the front sprocket assembly according to the tenth aspect, it is possible to reliably make the upshifting operation smoother.

In accordance with an eleventh aspect of the present invention, the front sprocket assembly according to any one of the first to tenth aspects is configured so that the less chain-interference recess has a maximum transverse length and a maximum radial length. The maximum radial length is larger than the maximum transverse length.

With the front sprocket assembly according to the eleventh aspect, the less chain-interference recess can effectively reduce interference between the at least one tooth of the plurality of second sprocket teeth and the chain in the upshifting operation. Thus, the less chain-interference recess can effectively make the upshifting operation smooth.

In accordance with a twelfth aspect of the present invention, the front sprocket assembly according to any one of the first to eleventh aspects is configured so that the less chain-interference recess extends radially inwardly from the driving surface with respect to the rotational center axis to have a curvature.

With the front sprocket assembly according to the twelfth aspect, the less chain-interference recess can more effectively make the upshifting operation smooth.

In accordance with a thirteenth aspect of the present invention, the front sprocket assembly according to the twelfth aspect is configured so that the curvature of the less chain-interference recess is configured to correspond to a rotational locus of the chain.

With the front sprocket assembly according to the thirteenth aspect, the less chain-interference recess can more effectively make the upshifting operation smooth.

In accordance with a fourteenth aspect of the present invention, the front sprocket assembly according to any one of the first to thirteenth aspects is configured so that the less chain-interference recess is configured to reduce interference between the at least one tooth of the plurality of second sprocket teeth and an outer link plate of the chain in the upshifting operation.

With the front sprocket assembly according to the fourteenth aspect, the less chain-interference recess can reduce interference between the at least one tooth of the plurality of second sprocket teeth and the outer link plate of the chain in the upshifting operation. Thus, the less chain-interference recess can effectively make the upshifting operation smooth.

In accordance with a fifteenth aspect of the present invention, the front sprocket assembly according to any one of the first to fourteenth aspects is configured so that at least two teeth of the plurality of second sprocket teeth each include the less chain-interference recess provided to the second axially inwardly facing surface.

With the front sprocket assembly according to the fifteenth aspect, the less chain-interference recess of the at least two of the plurality of second sprocket teeth can effectively make the upshifting operation smooth.

In accordance with a sixteenth aspect of the present invention, the front sprocket assembly according to the fifteenth aspect is configured so that at least four teeth of the plurality of second sprocket teeth each include the less chain-interference recess provided to the second axially inwardly facing surface.

With the front sprocket assembly according to the sixteenth aspect, the less chain-interference recess of the at least four of the plurality of second sprocket teeth can more effectively make the upshifting operation smooth.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
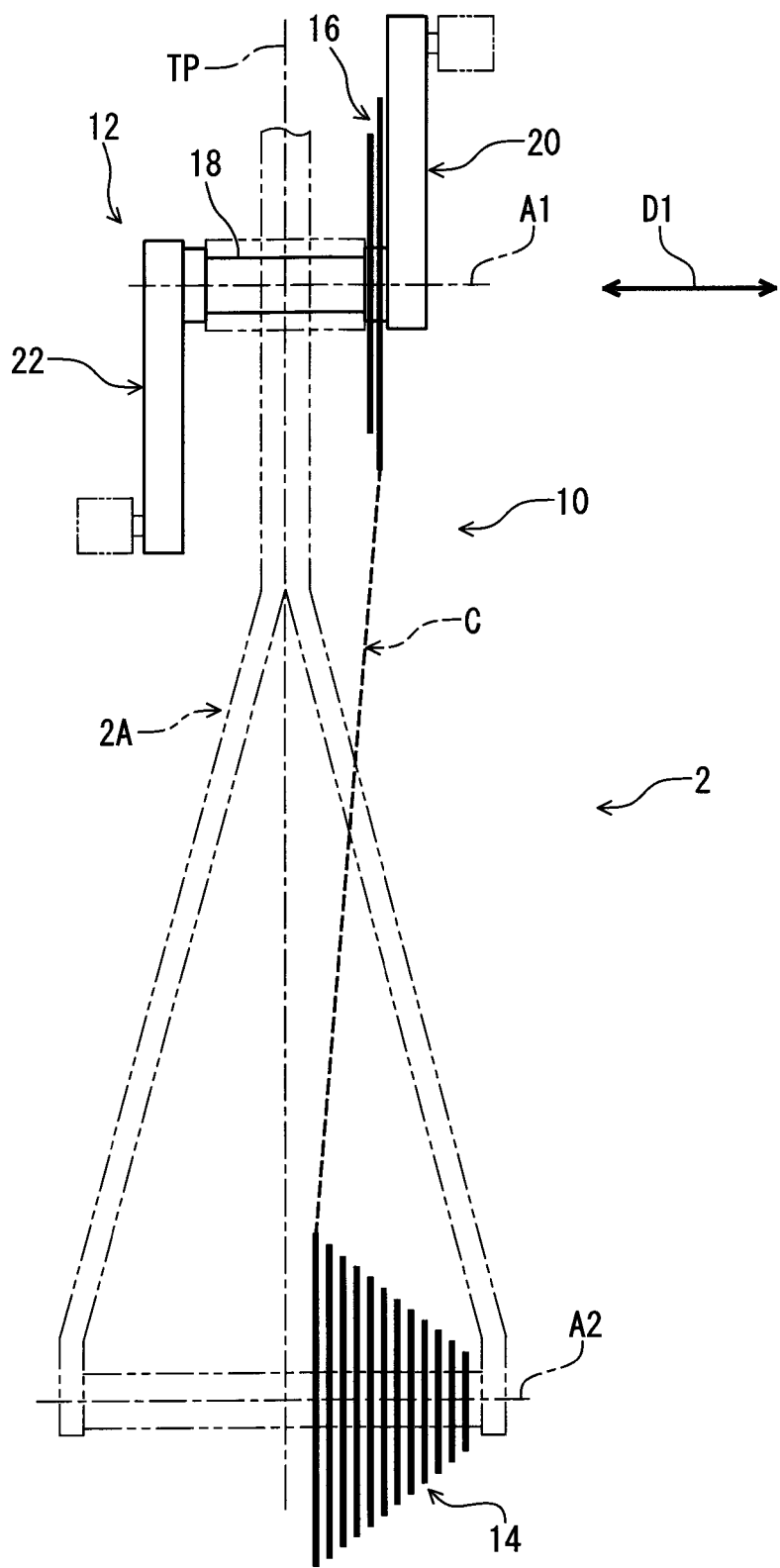
FIG. 1 is a schematic diagram of a drive train of a human-powered vehicle including a front sprocket assembly in accordance with a first embodiment.

The embodiment(s) will now be described with reference to the accompanying drawings, wherein like reference numerals designate corresponding or identical elements throughout the various drawings.

First Embodiment

As seen in FIG. 1, a drive train 10 for a human-powered vehicle 2 includes a crank assembly 12, a rear sprocket assembly 14, and a chain C. The crank assembly 12 is configured to be rotatably coupled to a vehicle body 2A of the human-powered vehicle 2 about a rotational center axis A1. The rear sprocket assembly 14 is configured to be rotatably coupled to the vehicle body 2A of the human-powered vehicle 2 about a rotational center axis A2. The crank assembly 12 includes a front sprocket assembly 16. The front sprocket assembly 16 is configured to be engaged with the chain C. The rear sprocket assembly 14 is configured to be engaged with the chain C.

The vehicle body 2A has a transverse center plane TP perpendicular to the rotational center axis A1. The transverse center plane TP is defined to bisect a transverse length of the vehicle body 2A in an axial direction D1 with respect to the rotational center axis A1.

Figure 2:
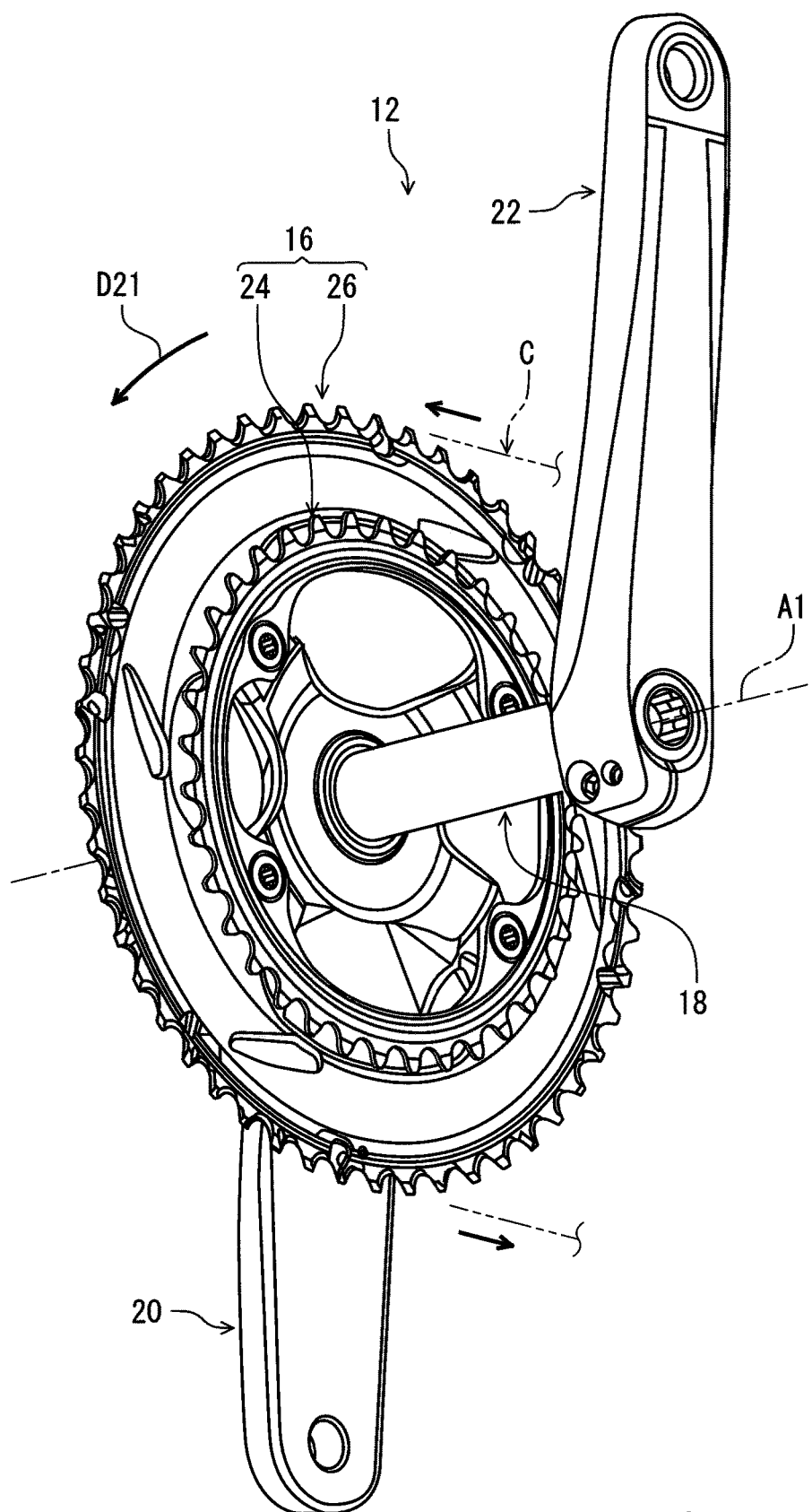
FIG. 2 is a perspective view of a crank assembly of the drive train illustrated in FIG. 1.

As seen in FIG. 2, the crank assembly 12 a crank axle 18, a first crank arm 20, and a second crank arm 22. The crank axle 18 extends along the rotational center axis A1. The first crank arm 20 and the second crank arm 22 are secured to the crank axle 18. The crank assembly 12 is rotated relative to the vehicle body 2A of the human-powered vehicle 2 about the rotational center axis A1 in a driving rotational direction D21 during pedaling.

The front sprocket assembly 16 is rotatable relative to the vehicle body 2A of the human-powered vehicle 2 along with the crank axle 18, the first crank arm 20, and the second crank arm 22 about the rotational center axis A1. The front sprocket assembly 16 is configured to be coupled to at least one of the crank axle 18 and the first crank arm 20. In the present embodiment, the front sprocket assembly 16 is configured to be coupled to the first crank arm 20. However, the front sprocket assembly 16 can be configured to be coupled to the crank axle 18 or both the crank axle 18 and the first crank arm 20 if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the crank assembly 12, the front sprocket assembly 16, or other components, should be interpreted relative to the human-powered vehicle 2 equipped with the crank assembly 12, the front sprocket assembly 16, or other components as used in an upright riding position on a horizontal surface.

Figure 3:
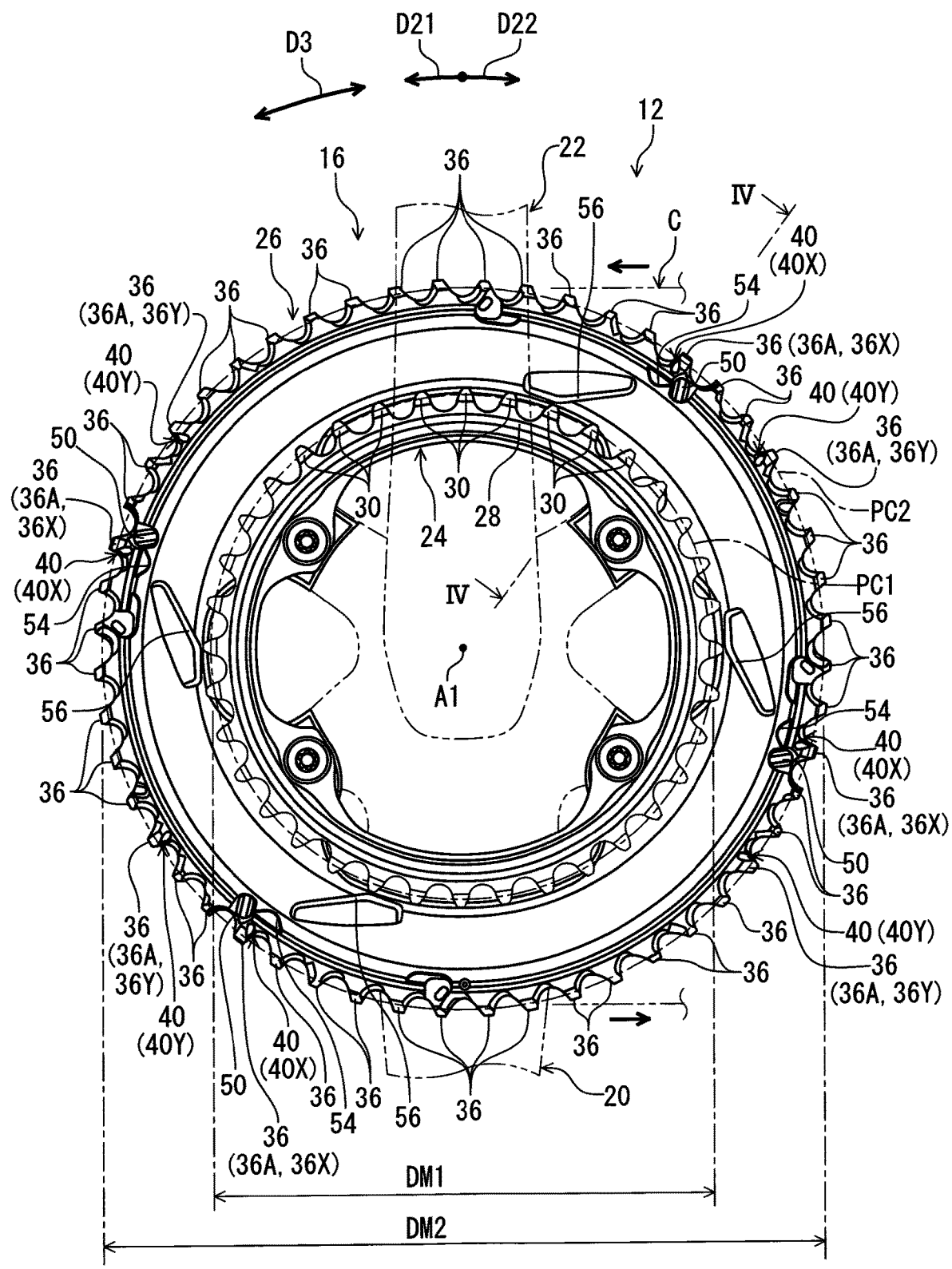
FIG. 3 is a side elevational view of the front sprocket assembly of the crank assembly illustrated in FIG. 2.

As seen in FIG. 3, the front sprocket assembly 16 for the human-powered vehicle 2 comprises a first sprocket 24 and a second sprocket 26. The first sprocket 24 includes a first sprocket body 28 and a plurality of first sprocket teeth 30. The plurality of first sprocket teeth 30 extends radially outwardly from a first outer periphery of the first sprocket body 28 with respect to the rotational center axis A1. In other words, the plurality of first sprocket teeth 30 extends outwardly in a radial direction with respect to the rotational center axis A1 from a first outer periphery of the first sprocket body 28. The first sprocket 24 has a first pitch circle diameter DM1. The first pitch circle diameter DM1 is defined as a diameter of a first pitch circle PC1 of the first sprocket 24.

The second sprocket 26 includes a second sprocket body 34 and a plurality of second sprocket teeth 36. The plurality of second sprocket teeth 36 extends radially outwardly from a second outer periphery of the second sprocket body 34 with respect to the rotational center axis A1. In other words, the plurality of second sprocket teeth 36 extends outwardly in a radial direction with respect to the rotational center axis A1 from a second outer periphery of the second sprocket body 34. The second sprocket 26 has a second pitch circle diameter DM2. The second pitch circle diameter DM2 is larger than the first pitch circle diameter DM1. The second pitch circle diameter DM2 is defined as a diameter of a second pitch circle PC2 of the second sprocket 26.

The first sprocket 24 corresponds to a low gear in the front sprocket assembly 16. The second sprocket 26 corresponds to a top gear in the front sprocket assembly 16. However, the front sprocket assembly 16 can include an additional sprocket assembly if needed and/or desired.

The first sprocket 24 has a first total tooth number. The first total tooth number is a total number of the first sprocket teeth 30. The second sprocket 26 has a second total tooth number. The second total tooth number is a total number of the second sprocket teeth 36. The second total tooth number is larger than the first total tooth number. The second total tooth number is equal to or larger than 50. A tooth number difference between the first total tooth number and the second total tooth number is equal to or larger than nine. The tooth number difference between the first total tooth number and the second total tooth number is equal to or smaller than 20.

In the present embodiment, the first tooth number is 36. The second tooth number is 52. The tooth number difference is 16. However, the first total tooth number is not limited to 36. The second total tooth number is not limited to 52. The tooth number difference can be equal to or smaller than nine if needed and/or desired. The tooth number difference can be equal to or larger than 20.

Figure 4:
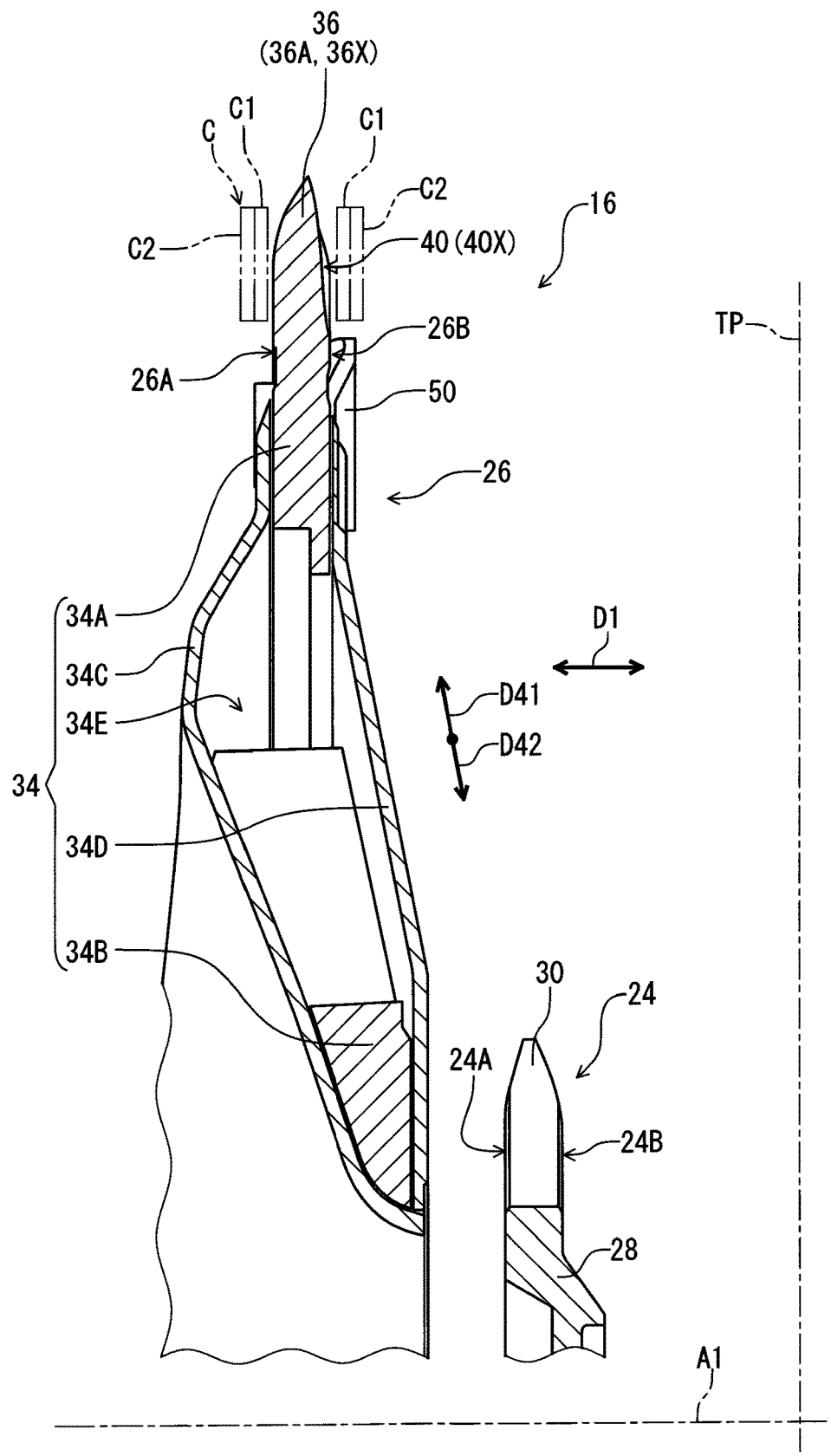
FIG. 4 is a cross-sectional view of the front sprocket assembly taken along line IV-IV of FIG. 3.

As seen in FIG. 4, the first sprocket 24 has a first axially outwardly facing surface 24A and a first axially inwardly facing surface 24B. The first axially inwardly facing surface 24B is provided on a reverse side of the first axially outwardly facing surface 24A in the axial direction D1 with respect to the rotational center axis A1 of the front sprocket assembly 16. The first axially inwardly facing surface 24B is configured to face toward the transverse center plane TP of the vehicle body 2A in a mounting state where the front sprocket assembly 16 is mounted to the vehicle body 2A of the human-powered vehicle 2.

The second sprocket 26 has a second axially outwardly facing surface 26A and a second axially inwardly facing surface 26B. The second axially inwardly facing surface 26B is provided on a reverse side of the second axially outwardly facing surface 26A in the axial direction D1. The second axially inwardly facing surface 26B is configured to face toward the transverse center plane TP of the vehicle body 2A in the mounting state where the front sprocket assembly 16 is mounted to the vehicle body 2A of the human-powered vehicle 2.

The second axially inwardly facing surface 26B is configured to face the first axially outwardly facing surface 24A of the first sprocket 24 in the axial direction D1 in an assembled state of the front sprocket assembly 16. The second sprocket 26 is adjacent to the first sprocket 24 without another sprocket between the first sprocket 24 and the second sprocket 26 in the axial direction D1.

For example, upshifting occurs the chain C is shifted from a sprocket to a neighboring larger sprocket in an upshifting direction D41. Downshifting occurs the chain C is shifted from a sprocket to a neighboring smaller sprocket in a downshifting direction D42.

In the present embodiment, the second sprocket body 34 includes a first annular body 34A, a second annular body 34B, a first cover 34C, and a second cover 34D. The first annular body 34A is provided radially outwardly of the second annular body 34B. The first annular body 34A is integrally provided with the plurality of second sprocket teeth 36 as a one-piece unitary member. The first cover 34C and the second cover 34D are attached to the first annular body 34A and the second annular body 34B to define an internal space 34E between the first cover 34C and the second cover 34D. The second annular body 34B is provided between the first cover 34C and the second cover 34D. The first annular body 34A is at least partially provided in the internal space 34E. The second annular body 34B is at least partially provided in the internal space 34E.

In the present embodiment, the first annular body 34A is partially provided in the internal space 34E. The second annular body 34B is entirely provided in the internal space 34E. However, the first annular body 34A can be entirely provided in the internal space 34E if needed and/or desired. The second annular body 34B is partially provided in the internal space 34E if needed and/or desired.

As seen in FIG. 3, at least one tooth 36A of the plurality of second sprocket teeth 36 includes a less chain-interference recess 40. The less chain-interference recess 40 is provided to the second axially inwardly facing surface 26B. At least two teeth 36A of the plurality of second sprocket teeth 36 each include the less chain-interference recess 40 provided to the second axially inwardly facing surface 26B. At least four teeth 36A of the plurality of second sprocket teeth 36 each include the less chain-interference recess 40 provided to the second axially inwardly facing surface 26B.

In the present embodiment, eight teeth 36A of the plurality of second sprocket teeth 36 each include the less chain-interference recess 40 provided to the second axially inwardly facing surface 26B. However, at least one tooth of the plurality of second sprocket teeth 36 can include the less chain-interference recess 40 if needed and/or desired.

The less chain-interference recesses 40 have the same structures as each other. However, at least one of the less chain-interference recesses 40 can have a structure different from the structure of another of the less chain-interference recesses 40 if needed and/or desired.

Figure 5:
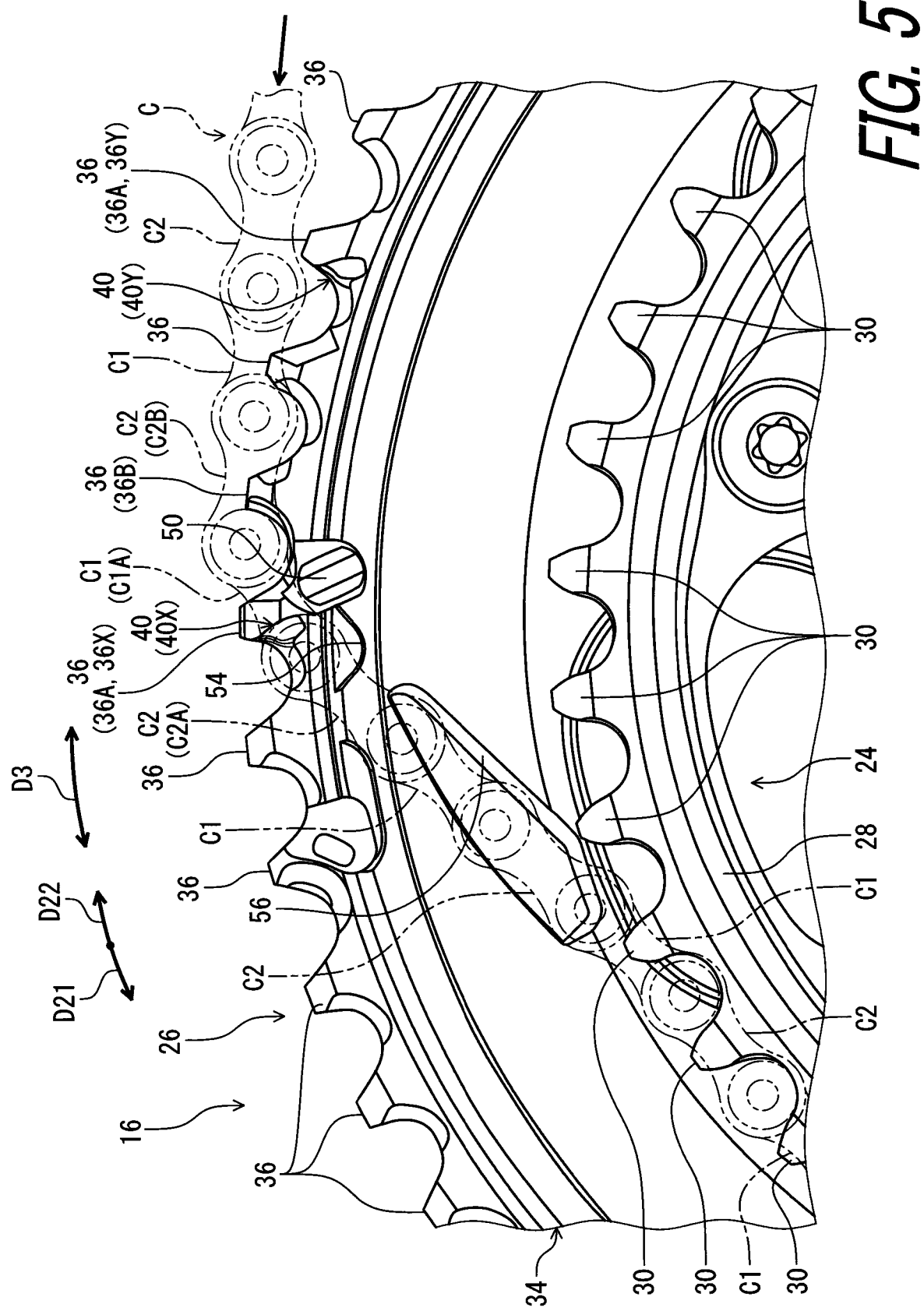
FIG. 5 is a side elevational view of the front sprocket assembly of the crank assembly illustrated in FIG. 3, with a chain (upshifting operation).

As seen in FIG. 5, the less chain-interference recess 40 is configured to reduce interference between the at least one tooth 36A of the plurality of second sprocket teeth 36 and the chain C in an upshifting operation in which the chain C is shifted from the first sprocket 24 toward the second sprocket 26. The less chain-interference recess 40 is configured to reduce interference between the at least one tooth 36A of the plurality of second sprocket teeth 36 and an outer link plate C2 (e.g., C2A) of the chain C in the upshifting operation.

Figure 6:
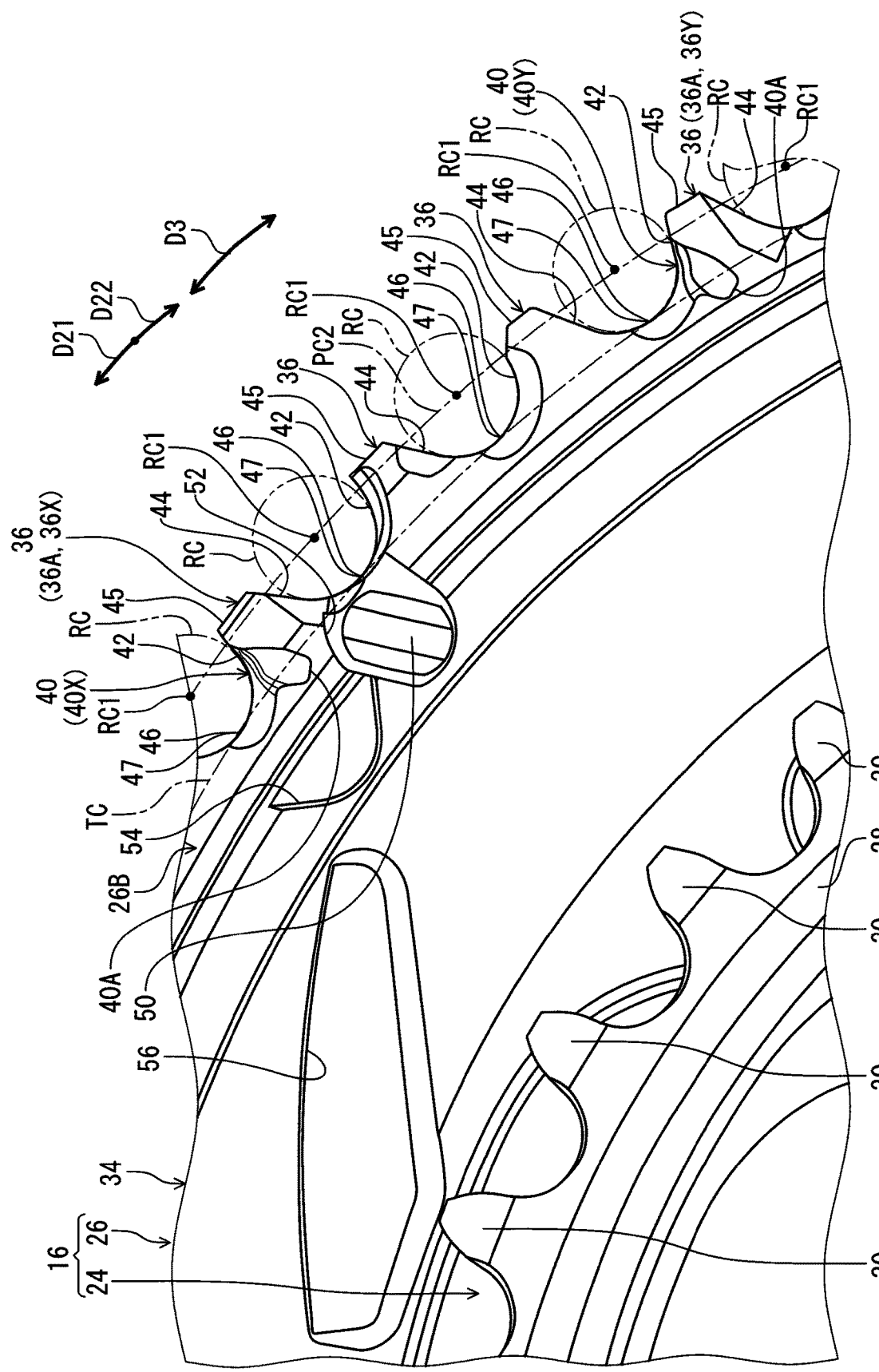
FIG. 6 is a partial side elevational view of the front sprocket assembly of the crank assembly illustrated in FIG. 3.

As seen in FIG. 6, the at least one tooth 36A of the plurality of second sprocket teeth 36 has a driving surface 42 and a non-driving surface 44. The non-driving surface 44 is provided on a reverse side of the driving surface 42 in a circumferential direction D3 with respect to the rotational center axis A1. In the present embodiment, each tooth of the plurality of second sprocket teeth 36 includes the driving surface 42 and the non-driving surface 44. The driving surface 42 is configured to face in the driving rotational direction D21 to transmit a rotational force to the chain C. The non-driving surface 44 is configured to face in a reverse rotational direction D22 which is an opposite direction of the driving rotational direction D21.

The second sprocket teeth 36 each include a tooth tip 45. The tooth tip 45 of the second sprocket tooth 36 is provided in a radially outermost end of the second sprocket tooth 36.

The second sprocket teeth 36 each include a first tooth bottom 46 and a second tooth bottom 47. The second sprocket tooth 36 is provided between the first tooth bottom 46 and the second tooth bottom 47. The first tooth bottom 46 of the second sprocket tooth 36A is provided on a downstream side of the second tooth bottom 47 of the second sprocket tooth 36A in the driving rotational direction D21. The tooth bottom circle TC is defined as a circle connecting the first tooth bottoms 46 and the second tooth bottoms 47 of the second sprocket teeth 36.

The driving surface 42 extends from the tooth tip 45 to the first tooth bottom 46 in the second sprocket tooth 36A. The non-driving surface 44 extends from the tooth tip 45 to the second tooth bottom 47 in the second sprocket tooth 36A.

The less chain-interference recess 40 has a radially innermost end 40A. The radially innermost end 40A is positioned radially inwardly from the tooth bottom circle TC of the plurality of second sprocket teeth 36.

The front sprocket assembly 16 further comprises a shift assist projection 50 at least a part of which is disposed radially inwardly from the non-driving surface 44 of the at least one tooth 36A of the plurality of second sprocket teeth 36 with respect to the rotational center axis A1. The shift assist projection 50 is coupled to the second sprocket 26. The shift assist projection 50 is configured to engage with the chain C to assist the upshifting operation.

The radially innermost end 40A of the less chain-interference recess 40 (e.g., 40X) is positioned at a downstream side from the shift assist projection 50 with respect to the driving rotational direction D21 of the front sprocket assembly 16. The shift assist projection 50 is disposed radially inwardly from the less chain-interference recess 40 (e.g., 40X) with respect to the rotational center axis A1. The less chain-interference recess 40 is at least partially provided on a downstream side of the shift assist projection 50 in the driving rotational direction D21 without a sprocket tooth between the less chain-interference recess 40 and the shift assist projection 50 in the driving rotational direction D21. The less chain-interference recess 40 is at least partially provided radially outwardly of the shift assist projection 50.

In the present embodiment, the less chain-interference recess 40 can be entirely provided on the downstream side of the shift assist projection 50 in the driving rotational direction D21 without a sprocket tooth between the less chain-interference recess 40 and the shift assist projection 50 in the driving rotational direction D21. The less chain-interference recess 40 is partially provided radially outwardly of the shift assist projection 50. However, the less chain-interference recess 40 can be entirely provided radially outwardly of the shift assist projection 50 if needed and/or desired.

The driving surface 42 includes a curved surface having a concave curved shape. The non-driving surface 44 includes a curved surface having a concave curved shape. The driving surface 42 and the non-driving surface 44 define a reference circle RC having a reference center RC1. The second pitch circle PC2 is defined on the reference centers RC1 of the reference circles RC. The less chain-interference recess 40 is partially provided between the tooth bottom circle TC and the second pitch circle PC2 as viewed in the axial direction D1.

Figure 7:
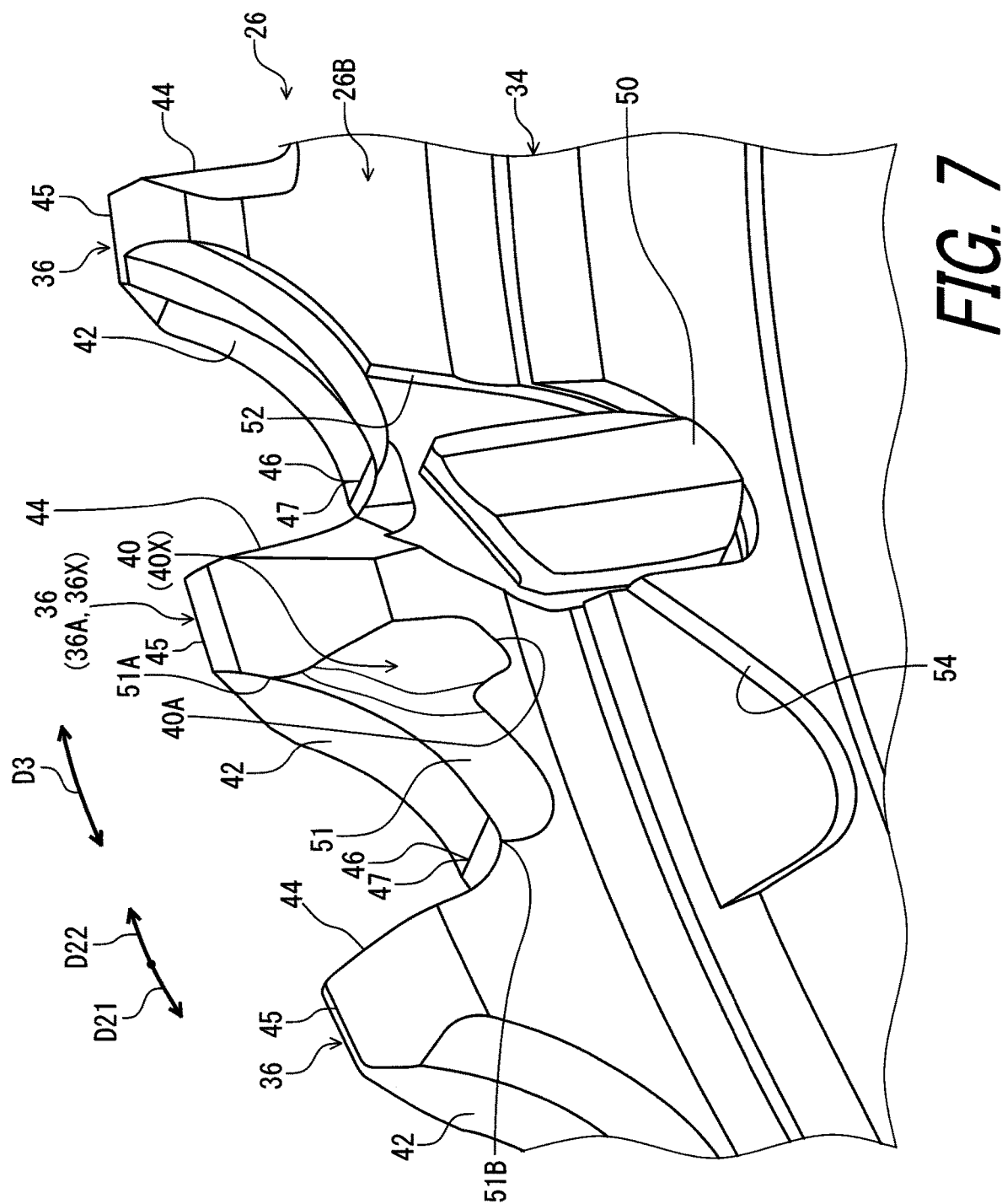
FIG. 7 is a perspective view of the front sprocket assembly of the crank assembly illustrated in FIG. 3.

As seen in FIG. 7, the second sprocket tooth 36A includes an inclined surface 51. The inclined surface 51 is provided along the driving surface 42 of the second sprocket tooth 36A. The inclined surface 51 includes a first chamfer end 51A and a second chamfer end 51B. The inclined surface 51 of the second sprocket tooth 36A extends from the first chamfer end 51A to the second chamfer end 51B along the driving surface 42 of the second sprocket tooth 36A. The first chamfer end 51A is closer to the tooth tip 45 than the second chamfer end 51B. The second chamfer end 51B is closer to the first tooth bottom 46 than the first chamfer end 51A.

The less chain-interference recess 40 extends radially inwardly from the inclined surface 51. The less chain-interference recess 40 protrudes radially inwardly from the inclined surface 51. The less chain-interference recess 40 extends radially inwardly from an intermediate part of the inclined surface 51 provided between the first chamfer end 51A and the second chamfer end 51B. The inclined surface 51 can be omitted from the second sprocket tooth 36A.

The second sprocket 26 includes an attachment recess 52. The attachment recess 52 is provided on the second axially inwardly facing surface 26B. The shift assist projection 50 is provided in the attachment recess 52.

The second sprocket 26 includes a first additional recess 54. The first additional recess 54 is provided on the second axially inwardly facing surface 26B. The first additional recess 54 is configured to reduce interference between the second sprocket body 34 and the chain C in the upshifting operation.

As seen in FIG. 6, the less chain-interference recess 40 is at least partially provided radially outwardly of the first additional recess 54. In the present embodiment, the less chain-interference recess 40 is entirely provided radially outwardly of the first additional recess 54. However, the less chain-interference recess 40 can be partially provided radially outwardly of the first additional recess 54.

The second sprocket 26 includes a second additional recess 56. The second additional recess 56 is provided on the second axially inwardly facing surface 26B. The second additional recess 56 is configured to reduce interference between the second sprocket body 34 and the chain C in the upshifting operation.

The first additional recess 54 is at least partially provided on the downstream side of the shift assist projection 50 in the driving rotational direction D21. The second additional recess 56 is at least partially provided on the downstream side of the shift assist projection 50 in the driving rotational direction D21. In the present embodiment, the first additional recess 54 is entirely provided on the downstream side of the shift assist projection 50 in the driving rotational direction D21. The second additional recess 56 is entirely provided on the downstream side of the shift assist projection 50 in the driving rotational direction D21. However, the first additional recess 54 can be partially provided on the downstream side of the shift assist projection 50 in the driving rotational direction D21. The second additional recess 56 can be partially provided on the downstream side of the shift assist projection 50 in the driving rotational direction D21. The second additional recess 56 is at least partially provided on the downstream side of the first additional recess 54 in the driving rotational direction D21. The second additional recess 56 is entirely provided on the downstream side of the first additional recess 54 in the driving rotational direction D21. However, the second additional recess 56 can be partially provided on the downstream side of the first additional recess 54 in the driving rotational direction D21.

As seen in FIGS. 2 and 3, in the present embodiment, the front sprocket assembly 16 comprises a plurality of shift assist projections 50. The second sprocket 26 includes a plurality of first additional recesses 54 and a plurality of second additional recesses 56. A total number of the shift assist projections 50 is four. A total number of the first additional recesses 54 is four. A total number of the second additional recesses 56 is four. However, the total number of the shift assist projections 50 is not limited to four. The total number of the first additional recesses 54 is not limited to four. The total number of the second additional recesses 56 is not limited to four.

The second sprocket teeth 36A includes the second sprocket teeth 36X and the second sprocket teeth 36Y. The less chain-interference recesses 40 includes the less chain-interference recesses 40X and the less chain-interference recesses 40Y. A total number of the second sprocket teeth 36X is four. A total number of the second sprocket teeth 36Y is four. A total number of the less chain-interference recesses 40X is four. A total number of the less chain-interference recesses 40Y is four. However, the total number of the second sprocket teeth 36X is not limited to four. The total number of the second sprocket teeth 36Y is not limited to four. The total number of the less chain-interference recesses 40X is not limited to four. The total number of the less chain-interference recesses 40Y is not limited to four. The second sprocket tooth 36X includes the less chain-interference recess 40X. The second sprocket tooth 36Y includes the less chain-interference recess 40Y.

The second sprocket tooth 36X is adjacent to the shift assist projection 50 in the circumferential direction D3 without another sprocket tooth between the second sprocket tooth 36X and the shift assist projection 50 in the circumferential direction D3. The less chain-interference recess 40X is adjacent to the shift assist projection 50 in the circumferential direction D3 without a sprocket tooth between the less chain-interference recess 40X and the shift assist projection 50 in the circumferential direction D3. The second sprocket tooth 36Y is provided in a position not corresponding to the shift assist projection 50. The less chain-interference recess 40Y is provided in a position not corresponding to the shift assist projection 50. However, the second sprocket tooth 36Y can be provided in a position corresponding to the shift assist projection 50 as with the second sprocket tooth 36X if needed and/or desired. The less chain-interference recess 40Y can be provided in a position corresponding to the shift assist projection 50 as with the less chain-interference recess 40X if needed and/or desired.

Figure 8:
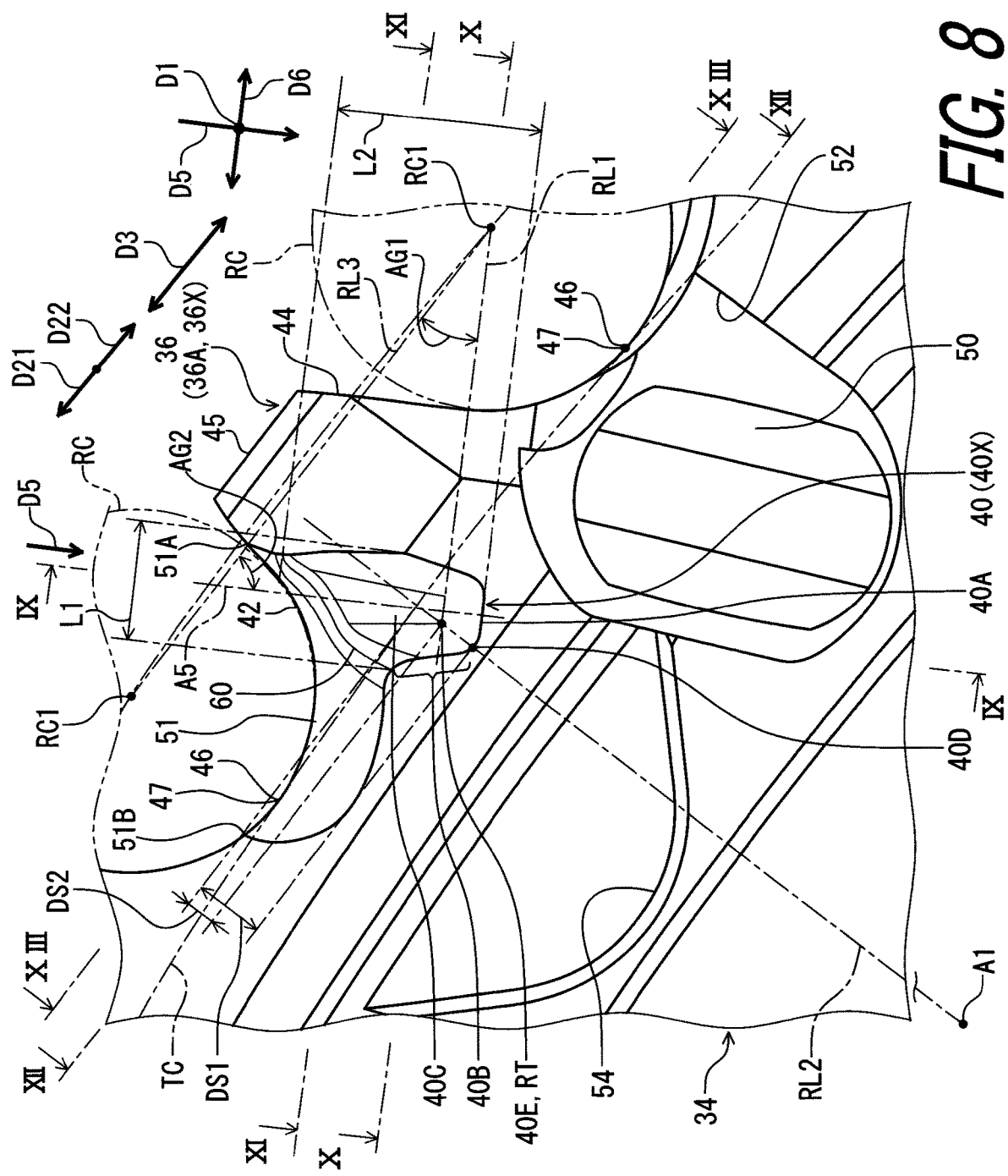
FIG. 8 is an enlarged partial side elevational view of the front sprocket assembly of the crank assembly illustrated in FIG. 3.

As seen in FIG. 8, the less chain-interference recess 40 extends radially inwardly with respect to the rotational center axis A1 in an elongated direction D5 inclining from the driving surface 42 toward an upstream side with respect to the driving rotational direction D21 of the front sprocket assembly 16. A boundary 60 is provided between the less chain-interference recess 40 and the inclined surface 51.

A radial distance DS1 radially defined from the tooth bottom circle TC to the radially innermost end 40A with respect to the rotational center axis A1 is equal to or larger than 1.0 mm. The radial distance DS1 is equal to or larger than 1.3 mm. The radial distance DS1 is equal to or smaller than 2.0 mm. In the present embodiment, the radially innermost end 40A of the less chain-interference recess 40 includes a radially innermost point 40D. The radially innermost point 40D is provided in a position which is the closest to the rotational center axis A1 among other parts of the radially innermost end 40A. The radial distance DS1 is radially defined from the tooth bottom circle TC to the radially innermost point 40D with respect to the rotational center axis A1. In other words, the radial distance DS1 is defined from the tooth bottom circle TC to the radially innermost point 40D along the radial direction with respect to the rotational center axis A1. The radial distance DS1 is equal to 1.5 mm. However, the radial distance DS1 is not limited to the above distance and ranges. The radial distance DS1 can also be referred to as a first radial distance DS1.

The less chain-interference recess 40 has a maximum transverse length L1 and a maximum radial length L2. The maximum radial length L2 is larger than the maximum transverse length L1. The maximum radial length L2 is defined in the elongated direction D5. The maximum transverse length L1 is defined in a width direction D6 perpendicular to the elongated direction D5 as viewed in the axial direction D1. The elongated direction D5 and the width direction D6 are perpendicular to the axial direction D1. The less chain-interference recess 40 includes a projected part 40B. The projected part 40B projects radially inwardly from the inclined surface 51. The projected part 40B includes the radially innermost end 40A. The projected part 40B has the maximum transverse length L1.

The less chain-interference recess 40 has a longitudinal axis A5 as viewed in the axial direction D1. The less chain-interference recess 40 extends along the longitudinal axis A5 as viewed in the axial direction D1. The elongated direction D5 is parallel to the longitudinal axis A5 of the less chain-interference recess 40. The width direction D6 is perpendicular to the longitudinal axis A5 as viewed in the axial direction D1. However, the maximum radial length L2 can be smaller than or equal to the maximum transverse length L1 if needed and/or desired.

Figure 9:
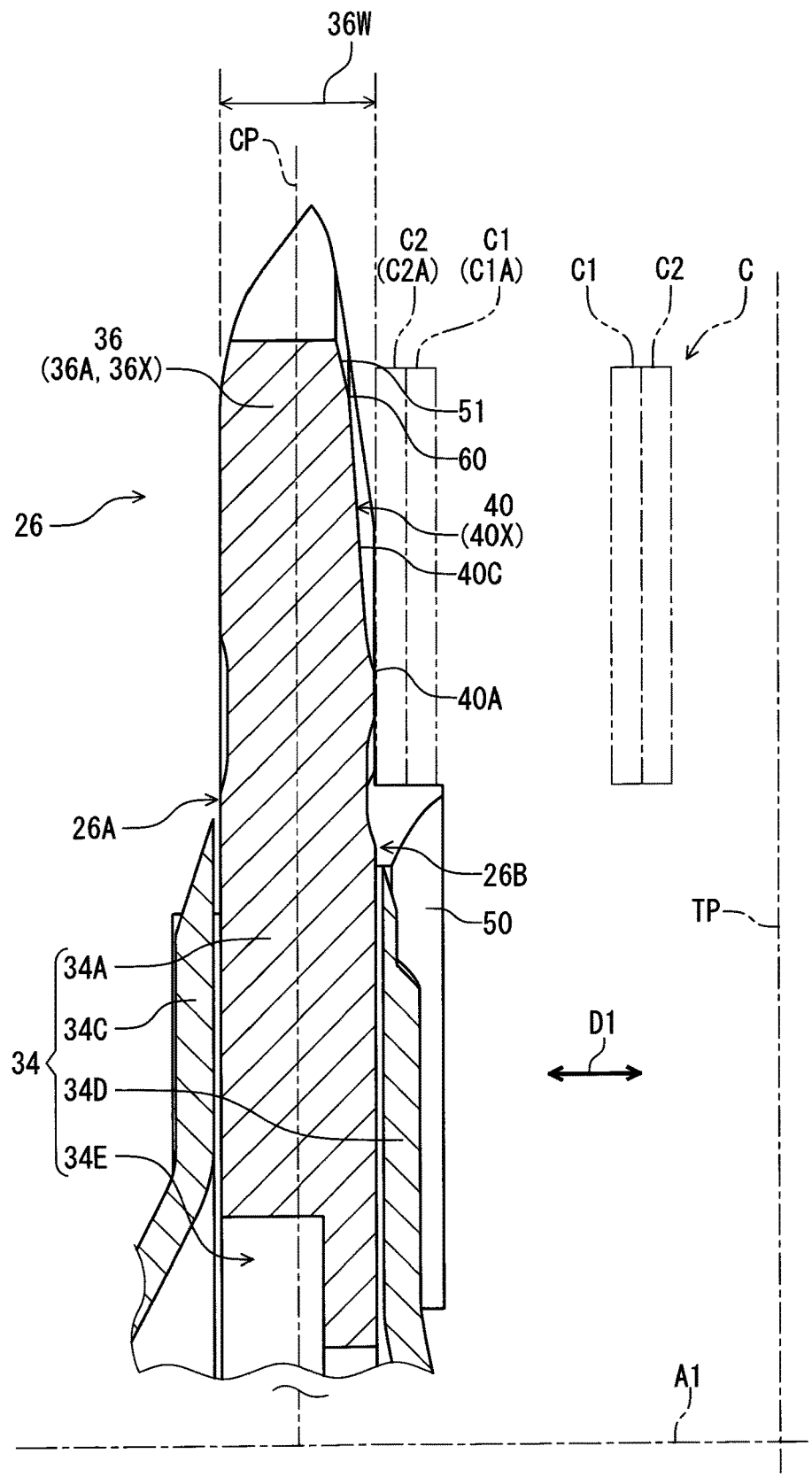
FIG. 9 is a cross-sectional view of the front sprocket assembly taken along line IX-IX of FIG. 8.
Figure 10:
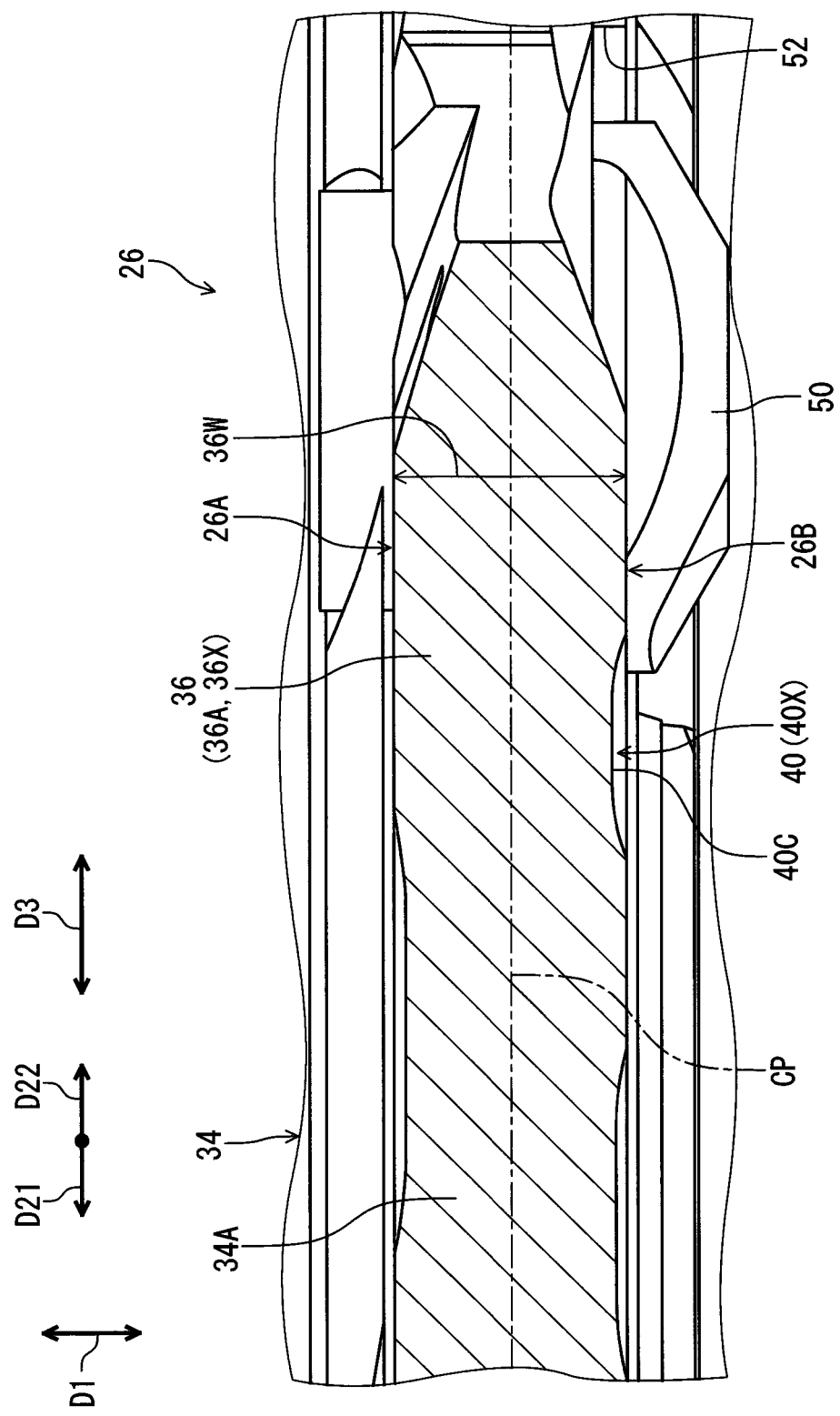
FIG. 10 is a cross-sectional view of the front sprocket assembly taken along line X-X of FIG. 8.

As seen in FIGS. 9 and 10, the less chain-interference recess 40 includes a bottom surface 40C. The bottom surface 40C is configured to face toward the transverse center plane TP of the vehicle body 2A in a mounting state where the front sprocket assembly 16 is mounted to the vehicle body 2A of the human-powered vehicle 2 (see e.g., FIG. 1).

The second sprocket tooth 36A has a center plane CP perpendicular to the rotational center axis A1. The center plane CP of the second sprocket tooth 36A is defined to bisect an axial width 36W of the second sprocket tooth 36A in the axial direction D1.

The less chain-interference recess 40 is recessed from the second axially inwardly facing surface 26B toward the center plane CP in the axial direction D1. The bottom surface 40C is the closest to the center plane CP in the axial direction D1 in the less chain-interference recess 40.

As seen in FIG. 9, the shift assist projection 50 protrudes from the second sprocket tooth 36A in the axial direction D1 to be engageable with the chain C. The shift assist projection 50 is configured to engage with an inner link plate C1 or an outer link plate C2 of the chain C in the upshifting operation.

As seen in FIG. 8, the bottom surface 40C extends along the longitudinal axis A5. The bottom surface 40C extends between the boundary 60 and the radially innermost end 40A along the longitudinal axis A5. The bottom surface 40C has a radially innermost bottom end 40E. A second radial distance DS2 is radially defined from the tooth bottom circle TC to the radially innermost bottom end 40E with respect to the rotational center axis A1. In other words, the second radial distance DS2 is defined from the tooth bottom circle TC to the radially innermost bottom end 40E along the radial direction with respect to the rotational center axis A1.

A reference point RT is an intersection point of a first reference line RL1 with a second reference line RL2 as viewed in the axial direction D1. The first reference line RL1 is perpendicular to the longitudinal axis A5 and connected with the reference center RC1 of the reference circle RC which is provided on an upstream side of the second sprocket tooth 36A in the driving rotational direction D21. The second reference line RL2 extends radially outwardly from the rotational center axis A1 through the radially innermost point 40D of the radially innermost end 40A.

In the present embodiment, the radially innermost bottom end 40E is provided on the reference point RT as viewed in the axial direction D1. However, the radially innermost bottom end 40E can be offset from the reference point RT as viewed in the axial direction D1 if needed and/or desired.

A third reference line RL3 is defined to extend between the reference centers RC1 of the reference circles RC which are adjacent to each other without another reference circle between the reference circles RC in the circumferential direction D3. A first reference angle AG1 is defined between the first reference line RL1 and the third reference line RL3 as viewed in the axial direction D1. A second reference angle AG2 is defined between the third reference line RL3 and the longitudinal axis A5 of the less chain-interference recess 40 as viewed in the axial direction D1. In the present embodiment, the first reference angle AG1 is equal to 30 degrees. The second reference angle AG2 is equal to 60 degrees.

However, the first reference angle AG1 is not limited to the above angle. The second reference angle AG2 is not limited to the above angle.

The second radial distance DS2 is equal to or larger than 0.5 mm. The second radial distance DS2 is equal to or smaller than 2.0 mm. In the present embodiment, the second radial distance DS2 ranges from 0.5 mm to 0.6 mm. However, the second radial distance DS2 is not limited to the above distance and ranges.

The radially innermost end 40A of the less chain-interference recess 40 is at least partially positioned radially inwardly of the first reference line RL1. The radially innermost end 40A of the less chain-interference recess 40 is at least partially positioned radially inwardly of the reference point RT. In the present embodiment, the radially innermost end 40A of the less chain-interference recess 40 is entirely positioned radially inwardly of the first reference line RL1. The radially innermost end 40A of the less chain-interference recess 40 is partially positioned radially inwardly of the reference point RT. However, the radially innermost end 40A of the less chain-interference recess 40 can be partially positioned radially inwardly of the first reference line RL1 if needed and/or desired. The radially innermost end 40A of the less chain-interference recess 40 can be entirely positioned radially inwardly of the reference point RT if needed and/or desired.

Figure 11:
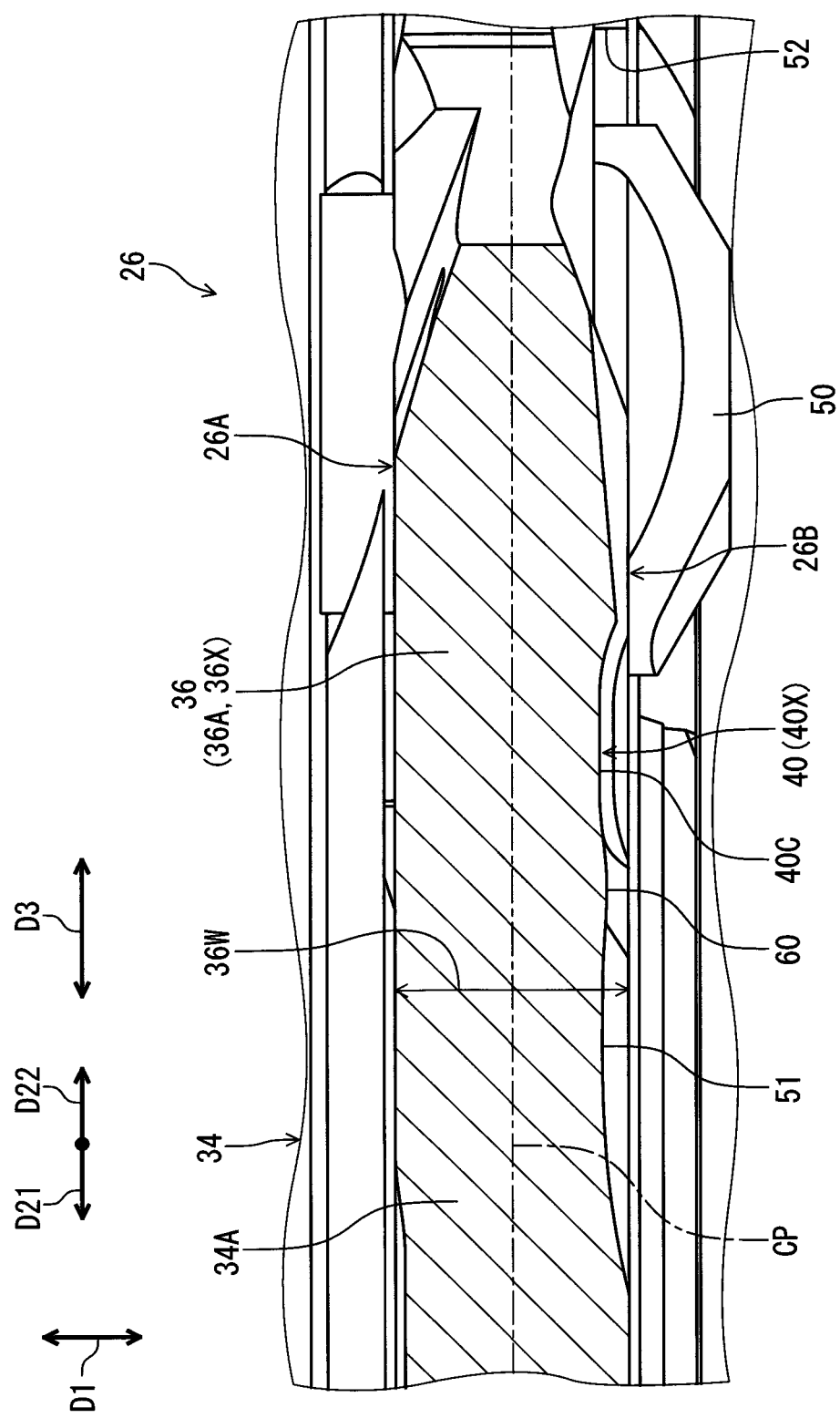
FIG. 11 is a cross-sectional view of the front sprocket assembly taken along line XI-XI of FIG. 8.
Figure 12:
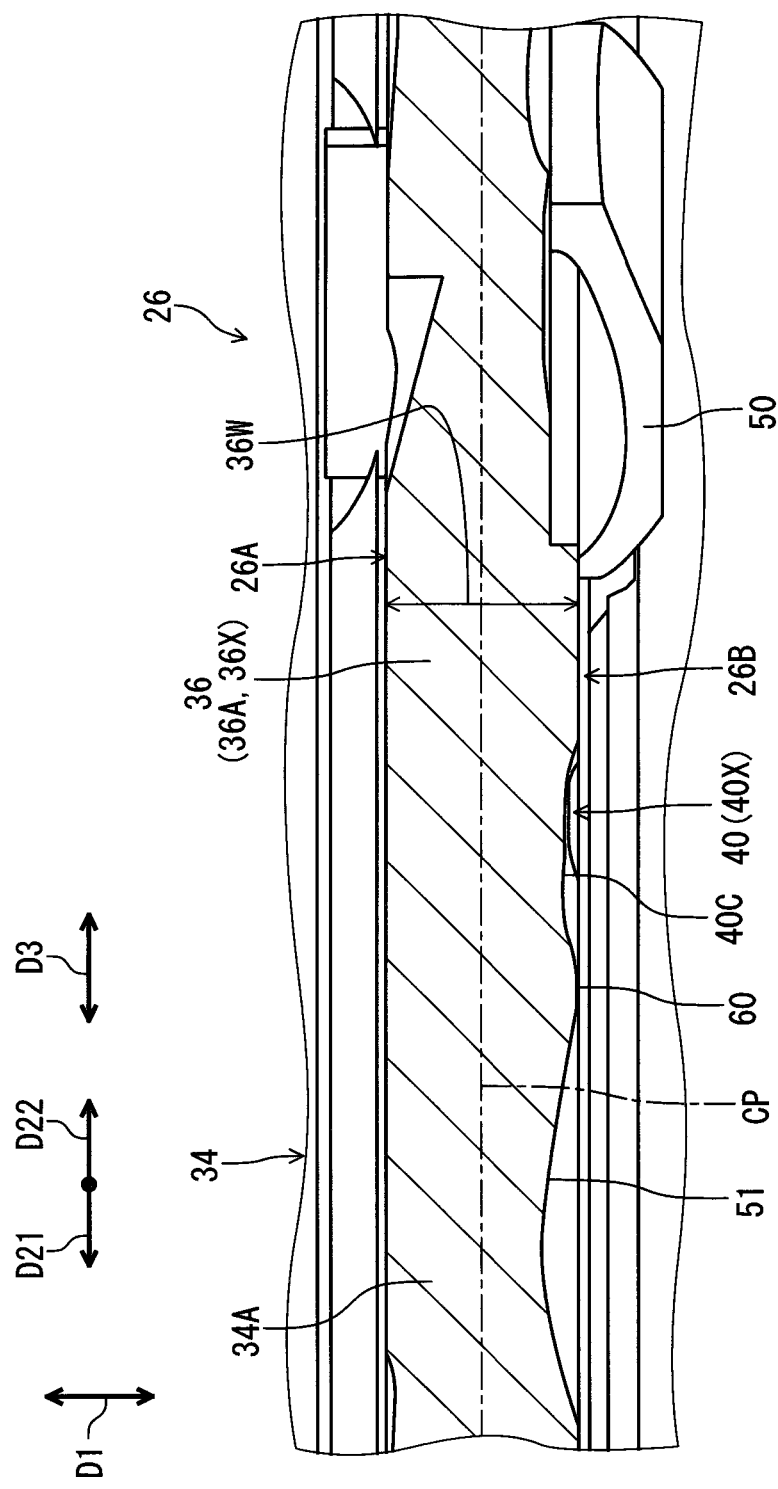
FIG. 12 is a cross-sectional view of the front sprocket assembly taken along line XII-XII of FIG. 8.
Figure 13:
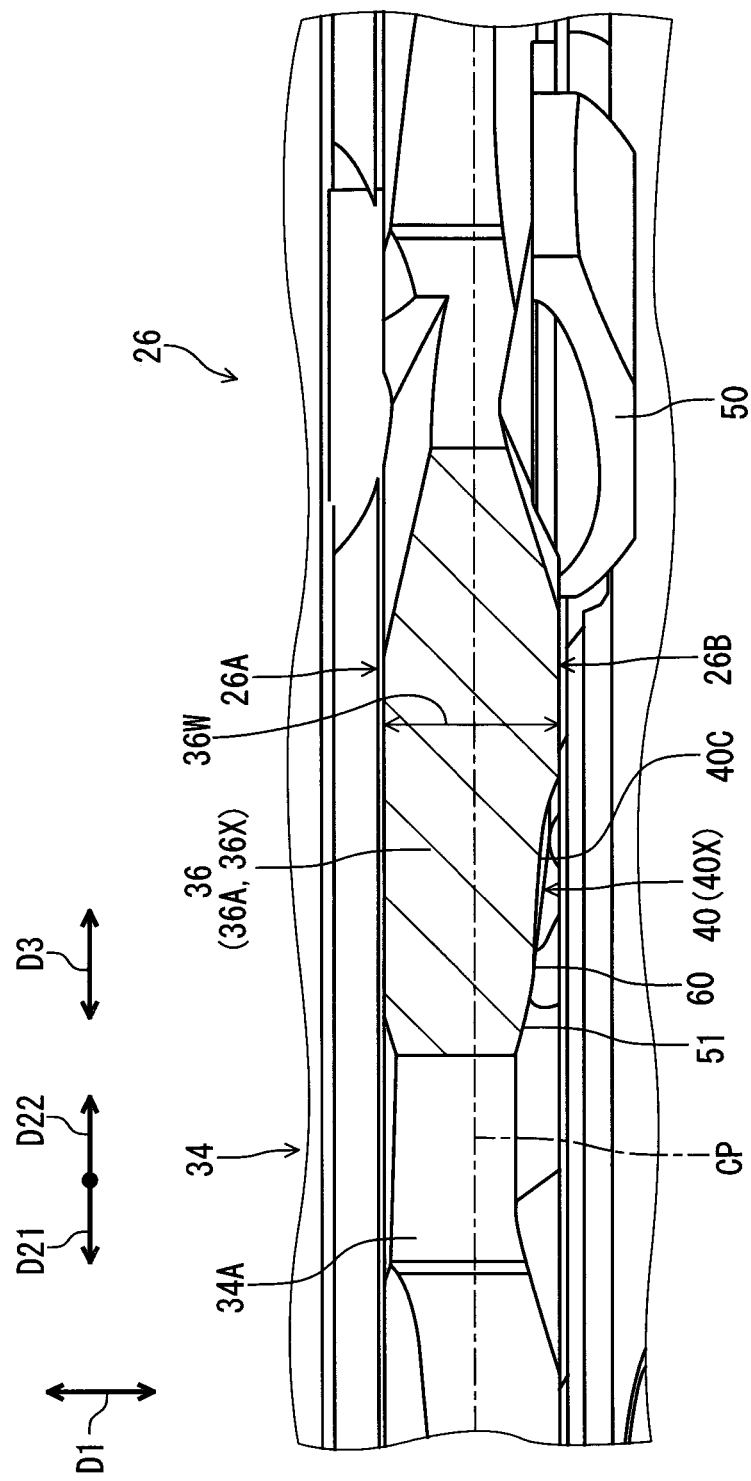
FIG. 13 is a cross-sectional view of the front sprocket assembly taken along line XIII-XIII of FIG. 8.

As seen in FIGS. 11 to 13, the boundary 60 protrudes in the axial direction D2 to form the less chain-interference recess 40 and the inclined surface 51. The boundary 60 smoothly connects the less chain-interference recess 40 with the inclined surface 51.

As seen in FIGS. 5 and 9, in the upshifting operation, the chain C is shifted from the first sprocket 24 toward the second sprocket 26 during pedaling by a gear changer such as a derailleur.

As seen in FIG. 5, the shift assist projection 50 radially outwardly lifts the chain C from the first sprocket teeth 30 to the second sprocket teeth 36 with respect to the rotational center axis A1 when the front sprocket assembly 16 is rotated in the driving rotational direction D21. The shift assist projection 50 radially outwardly lifts the inner link plate C1A of the chain C from the first sprocket teeth 30 to the second sprocket teeth 36 with respect to the rotational center axis A1 in a chain phase illustrated in FIG. 5 when the front sprocket assembly 16 is rotated in the driving rotational direction D21. The shift assist projection 50 radially outwardly lifts the outer link plate C2A of the chain C from the first sprocket teeth 30 to the second sprocket teeth 36 with respect to the rotational center axis A1 in another chain phase when the front sprocket assembly 16 is rotated in the driving rotational direction D21. The less chain-interference recess 40 (e.g., 40X) is provided closer to the outer link plates C2A of the chain C than the inner link plate C1A when the shift assist projection 50 radially outwardly lifts the inner link plate C1A with respect to the rotational center axis A1 in the chain phase illustrated in FIG. 5. The second sprocket tooth 36B is being inserted between the opposed pair of outer link plates C2B when the inner link plate C1A radially outwardly lifts the chain C from the first sprocket teeth 30 to the uppermost position illustrated in FIG. 13.

Figure 14:
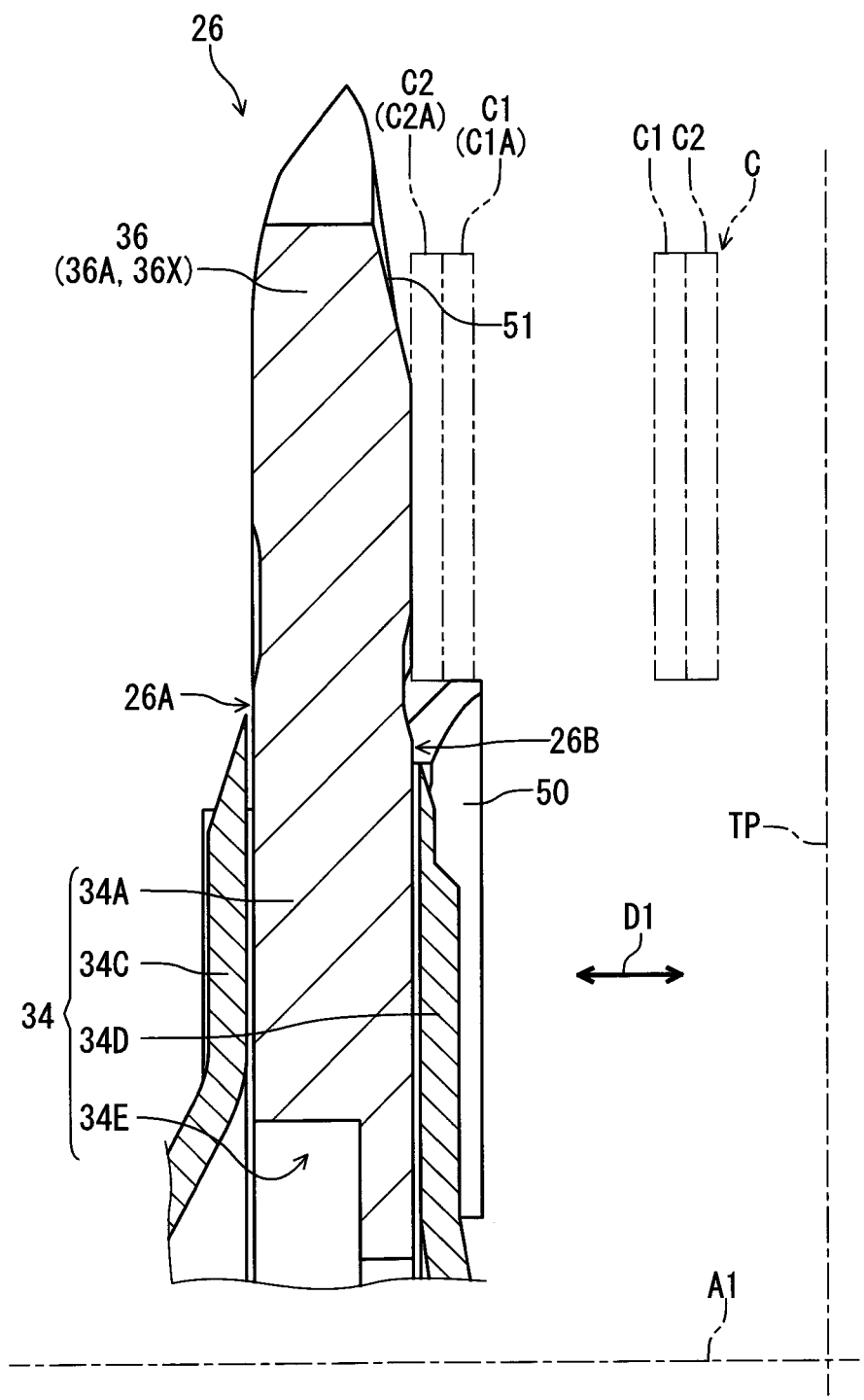
FIG. 14 is a cross-sectional view of a front sprocket assembly in accordance with a comparative example, with a less chain-interference recess omitted.
Figure 15:
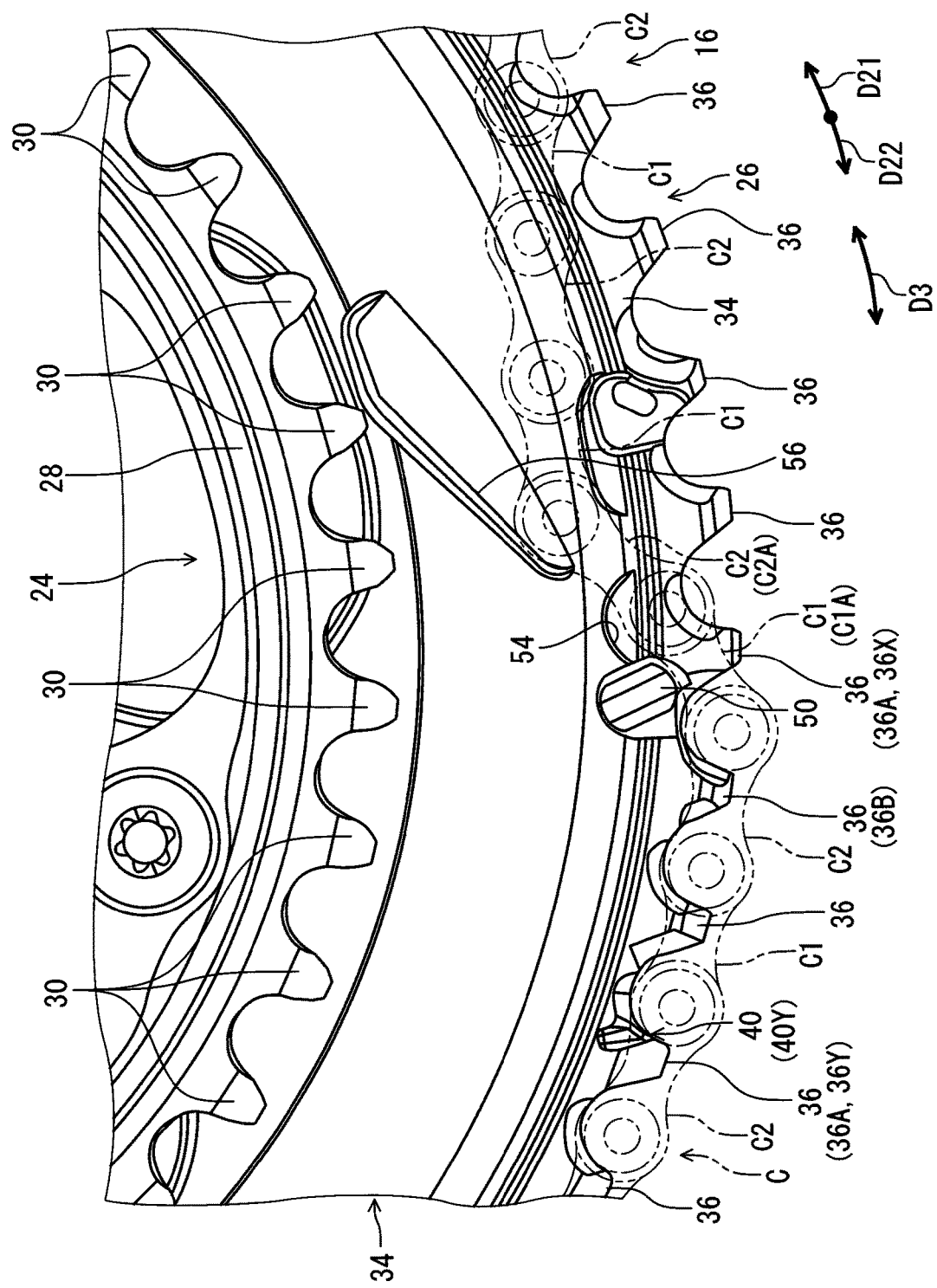
FIG. 15 is a side elevational view of the front sprocket assembly in accordance with the comparative example, with the chain (upshifting operation).

As seen in FIGS. 14 and 15, the second sprocket tooth 36 likely interfere with the outer link plate C2A of the chain C in a case where the second sprocket tooth 36 does not include the less chain-interference recess 40 (e.g., 40X). The interference between the second sprocket tooth 36 and the outer link plate C2A of the chain C likely restricts smooth completion of the upshifting operation. For example, the interference between the second sprocket tooth 36 and the outer link plate C2A of the chain C likely restricts the inner link plate C1A and/or the outer link plate C2A from moving c relative to the second sprocket 26 with respect to the rotational center axis A1 before the completion of the upshifting operation.

Figure 16:
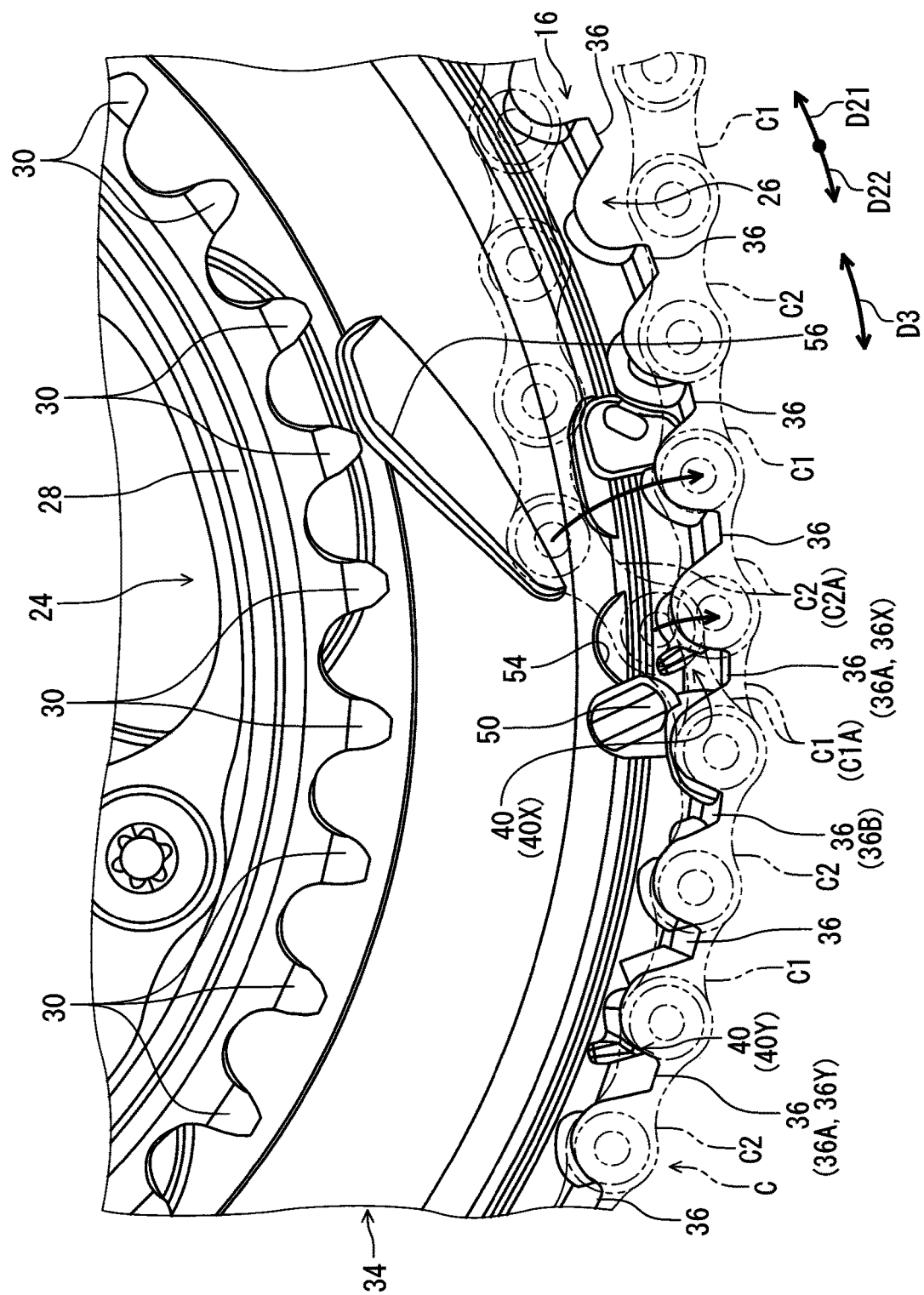
FIG. 16 is a side elevational view of the front sprocket assembly of the crank assembly illustrated in FIG. 3, with the chain (upshifting operation).

As seen in FIGS. 9 and 16, however, the less chain-interference recess 40 (e.g., 40X) is configured to reduce interference between the second sprocket tooth 36 and the chain C in the upshifting operation. The less chain-interference recess 40 (e.g., 40X) is configured to reduce interference between the at least one tooth 36A of the plurality of second sprocket teeth 36 and the outer link plate C2A of the chain C in the upshifting operation. The less chain-interference recess 40 (e.g., 40X) is configured to facilitate the inner link plate C1A and/or the outer link plate C2A to move radially outwardly relative to the second sprocket 26 with respect to the rotational center axis A1 before the completion of the upshifting operation. Especially, the less chain-interference recess 40 (e.g., 40X) is configured to facilitate the inner link plate C1A and/or the outer link plate C2A to move radially outwardly relative to the second sprocket 26 with respect to the rotational center axis A1 in a chain phase where the inner link plate C1A engages with the shift assist projection 50. Thus, the less chain-interference recess 40 (e.g., 40X) can make the upshifting operation smooth.

Second Embodiment

A front sprocket assembly 216 in accordance with a second embodiment will be described below referring to FIGS. 17 to 22. The front sprocket assembly 216 has the same structure and/or configuration as those of the front sprocket assembly 16 except for the less chain-interference recess 40. Thus, elements having substantially the same function as those in the first embodiment will be numbered the same here and will not be described and/or illustrated again in detail here for the sake of brevity.

Figure 17:
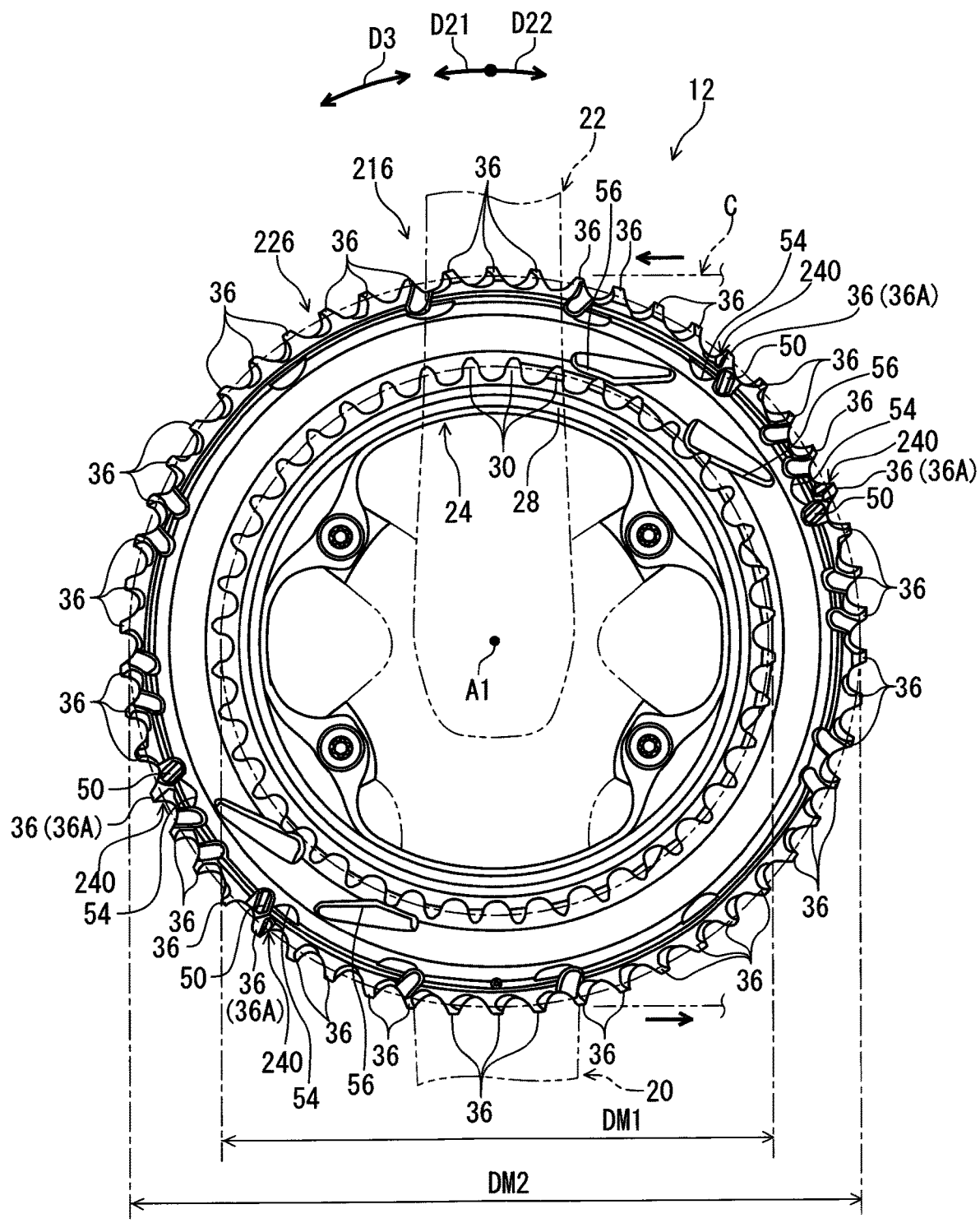
FIG. 17 is a perspective view of a crank assembly including a front sprocket assembly in accordance with a second embodiment.

As seen in FIG. 17, the front sprocket assembly 216 for the human-powered vehicle 2 comprises the first sprocket 24 and a second sprocket 226. The second sprocket 226 includes the second sprocket body 34 and the plurality of second sprocket teeth 36. In the present embodiment, the first tooth number is 40. The second tooth number is 50. The tooth number difference is 14. However, the first total tooth number is not limited to 40. The second total tooth number is not limited to 54. The tooth number difference is not limited to 14.

At least one tooth 36A of the plurality of second sprocket teeth 36 includes a less chain-interference recess 240. The less chain-interference recess 240 is provided to the second axially inwardly facing surface 26B. At least two teeth 36A of the plurality of second sprocket teeth 36 each include the less chain-interference recess 240 provided to the second axially inwardly facing surface 26B. At least four teeth 36A of the plurality of second sprocket teeth 36 each include the less chain-interference recess 240 provided to the second axially inwardly facing surface 26B.

In the present embodiment, four teeth 36A of the plurality of second sprocket teeth 36 each include the less chain-interference recess 240 provided to the second axially inwardly facing surface 26B. However, at least one tooth of the plurality of second sprocket teeth 36 can include the less chain-interference recess 240 if needed and/or desired.

The less chain-interference recesses 240 have the same structures as each other. However, at least one of the less chain-interference recesses 40 can have a structure different from the structure of another of the less chain-interference recesses 40 if needed and/or desired.

Figure 18:
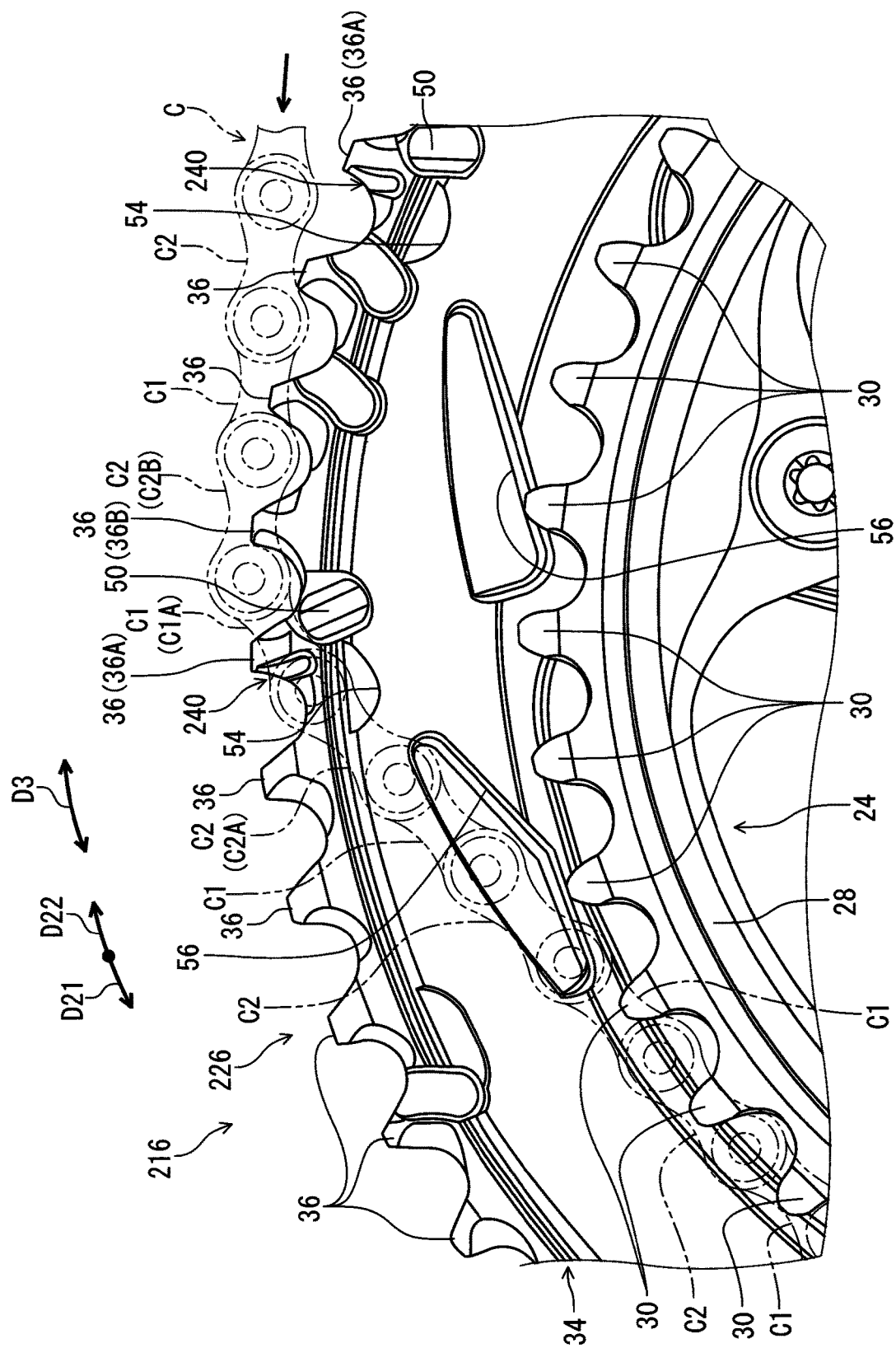
FIG. 18 is a side elevational view of the front sprocket assembly of the crank assembly illustrated in FIG. 17, with a chain (upshifting operation).

As seen in FIG. 18, the less chain-interference recess 240 is configured to reduce interference between the at least one tooth 36A of the plurality of second sprocket teeth 36 and the chain C in an upshifting operation in which the chain C is shifted from the first sprocket 24 toward the second sprocket 226. The less chain-interference recess 240 is configured to reduce interference between the at least one tooth 36A of the plurality of second sprocket teeth 36 and the outer link plate C2 (e.g., C2A) of the chain C in the upshifting operation.

Figure 19:
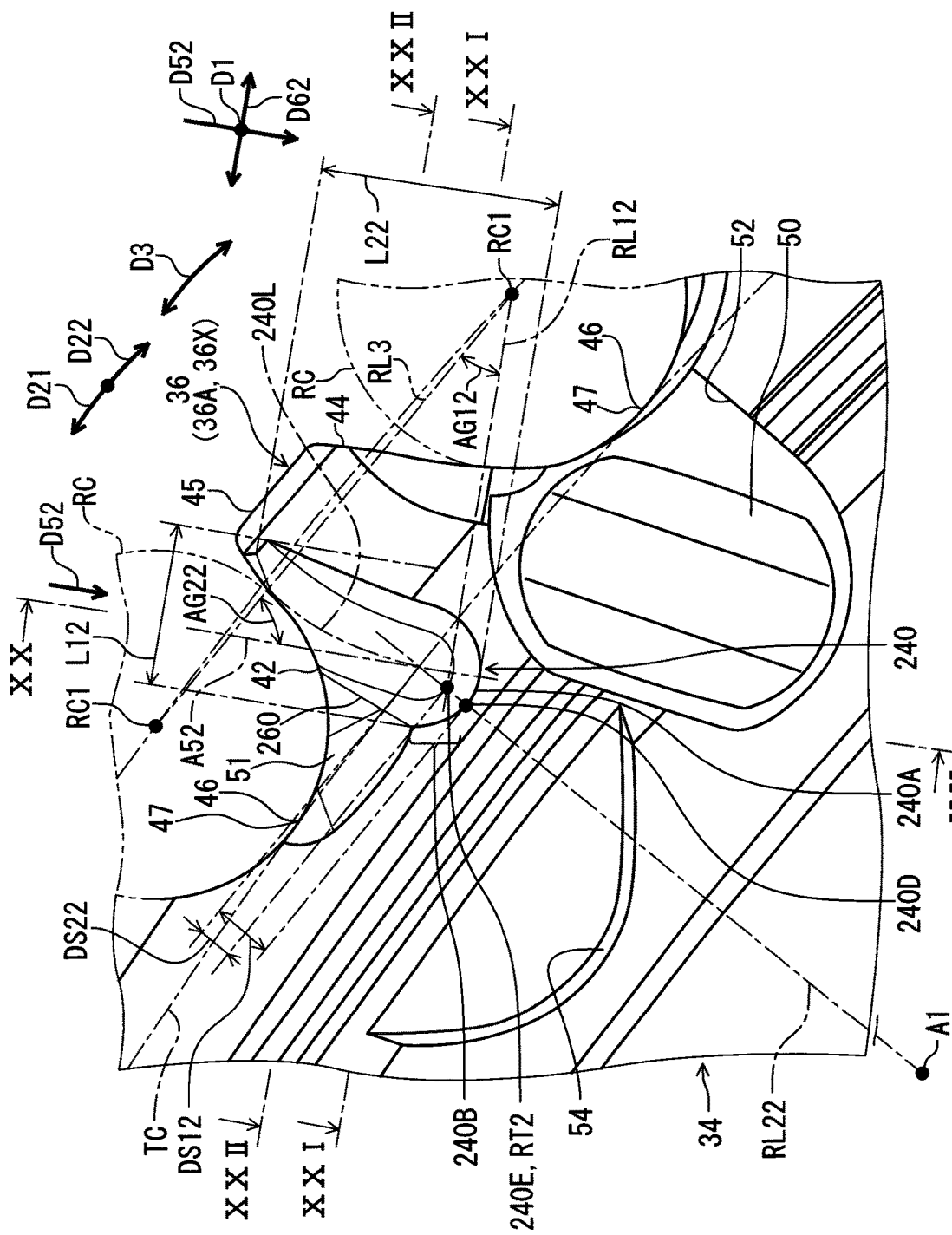
FIG. 19 is an enlarged partial side elevational view of the front sprocket assembly of the crank assembly illustrated in FIG. 17.

As seen in FIG. 19, the less chain-interference recess 240 has a radially innermost end 240A. The radially innermost end 240A is positioned radially inwardly from the tooth bottom circle TC of the plurality of second sprocket teeth 36.

The radially innermost end 240A of the less chain-interference recess 240 is positioned at a downstream side from the shift assist projection 50 with respect to the driving rotational direction D21 of the front sprocket assembly 216. The shift assist projection 50 is disposed radially inwardly from the less chain-interference recess 240 with respect to the rotational center axis A1. The less chain-interference recess 240 extends from the driving surface 42 of the second sprocket tooth 36A toward the shift assist projection 50. The less chain-interference recess 240 is at least partially provided on a downstream side of the shift assist projection 50 in the driving rotational direction D21 without a sprocket tooth between the less chain-interference recess 240 and the shift assist projection 50 in the driving rotational direction D21. The less chain-interference recess 240 is at least partially provided radially outwardly of the shift assist projection 50.

In the present embodiment, the less chain-interference recess 240 can be entirely provided on the downstream side of the shift assist projection 50 in the driving rotational direction D21 without a sprocket tooth between the less chain-interference recess 240 and the shift assist projection 50 in the driving rotational direction D21. The less chain-interference recess 240 is partially provided radially outwardly of the shift assist projection 50. However, the less chain-interference recess 240 can be entirely provided radially outwardly of the shift assist projection 50 if needed and/or desired.

The less chain-interference recess 240 extends radially inwardly from the driving surface 42. The less chain-interference recess 240 protrudes radially inwardly from the inclined surface 51. The inclined surface 51 can be omitted from the second sprocket tooth 36A.

The less chain-interference recess 240 extends radially inwardly with respect to the rotational center axis A1 in an elongated direction D52 inclining from the driving surface 42 toward an upstream side with respect to the driving rotational direction D21 of the front sprocket assembly 216. A boundary 260 is provided between the less chain-interference recess 240 and the inclined surface 51.

A radial distance DS12 radially defined from the tooth bottom circle TC to the radially innermost end 240A with respect to the rotational center axis A1 is equal to or larger than 1.0 mm. The radial distance DS12 is equal to or larger than 1.3 mm. The radial distance DS12 is equal to or smaller than 2.0 mm. In the present embodiment, the radially innermost end 240A of the less chain-interference recess 240 includes a radially innermost point 240D. The radially innermost point 240D is provided in a position which is the closest to the rotational center axis A1 among other parts of the radially innermost end 240A. The radial distance DS12 is radially defined from the tooth bottom circle TC to the radially innermost point 240D with respect to the rotational center axis A1. In other words, the radial distance DS12 is defined from the tooth bottom circle TC to the radially innermost point 240D along the radial direction with respect to the rotational center axis A1. The radial distance DS12 is equal to 1.4 mm. However, the radial distance DS12 is not limited to the above distance and ranges. The radial distance DS12 can also be referred to as a first radial distance DS12.

The less chain-interference recess 240 has a maximum transverse length L12 and a maximum radial length L22. The maximum radial length L22 is larger than the maximum transverse length L12. The maximum radial length L22 is defined in the elongated direction D52. The maximum transverse length L12 is defined in a width direction D62 perpendicular to the elongated direction D52 as viewed in the axial direction D1. The elongated direction D52 and the width direction D62 are perpendicular to the axial direction D1. The less chain-interference recess 240 includes a projected part 240B. The projected part 240B projects radially inwardly from the inclined surface 51. The projected part 40B includes the radially innermost end 240A. The projected part 40B has the maximum transverse length L12. The radially innermost end 240A has the maximum transverse length L12.

The less chain-interference recess 240 has a longitudinal axis A52 as viewed in the axial direction D1. The radially innermost end 240A of the less chain-interference recess 240 extends along the longitudinal axis A52 as viewed in the axial direction D1. The elongated direction D52 is parallel to the longitudinal axis A52 of the less chain-interference recess 240. The width direction D62 is perpendicular to the longitudinal axis A52 as viewed in the axial direction D1. The maximum radial length L22 can be smaller than or equal to the maximum transverse length L12 if needed and/or desired.

The less chain-interference recess 240 extends radially inwardly from the driving surface 42 with respect to the rotational center axis A1 to have a curvature. The curvature of the less chain-interference recess 240 is configured to correspond to a rotational locus 240L of the chain C. The curvature of the less chain-interference recess 240 is configured to correspond to the rotational locus 240L of the inner link plate C1. The rotational locus 240L has a rotational center provided on the reference center RC1 of the reference circle RC which is provided on an upstream side of the less chain-interference recess 240. The less chain-interference recess 240 extends radially inwardly from the driving surface 42 to the radially innermost end 240A along the rotational locus 240L.

Figure 20:
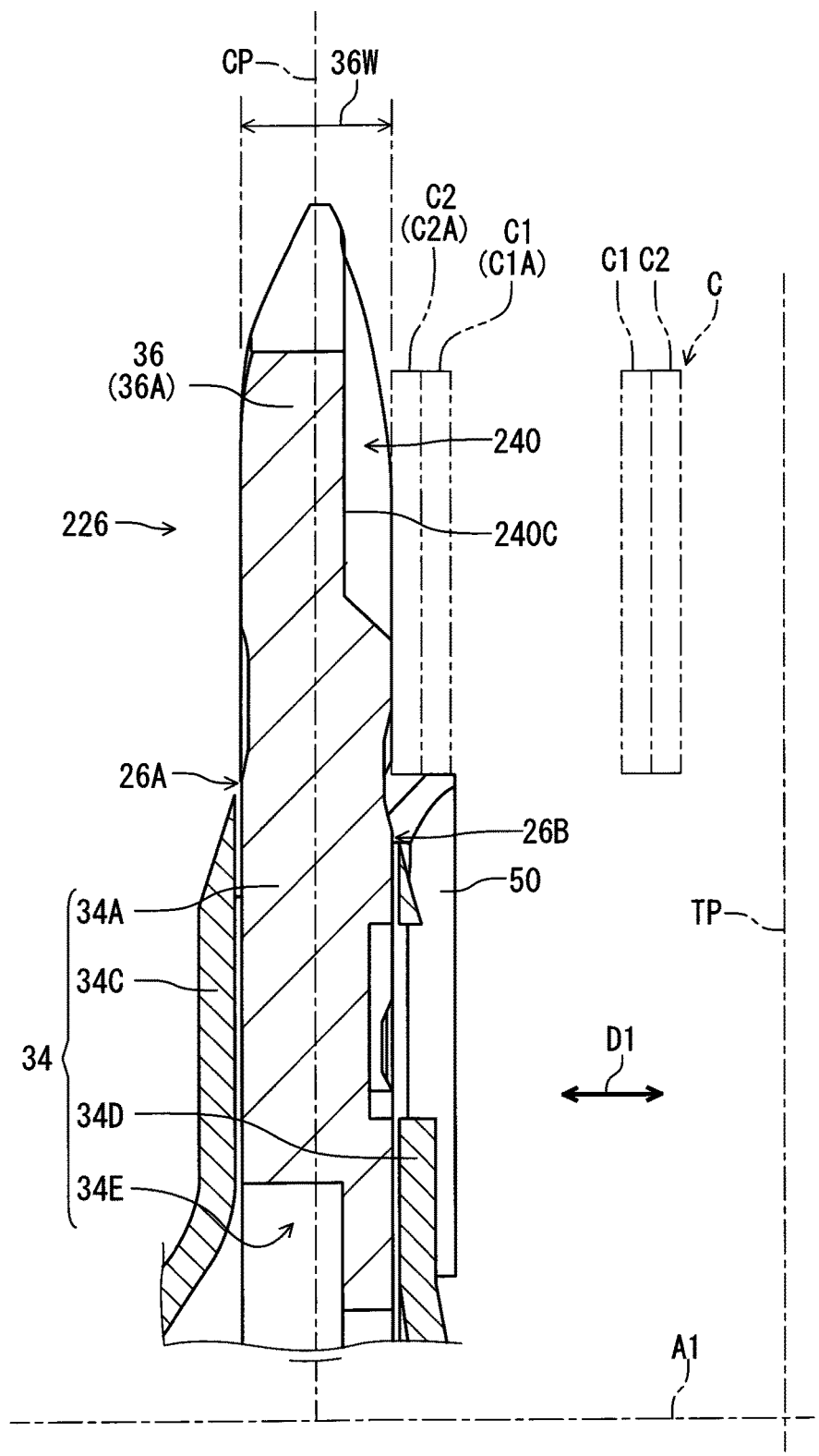
FIG. 20 is a cross-sectional view of the front sprocket assembly taken along line XX-XX of FIG. 19.
Figure 21:
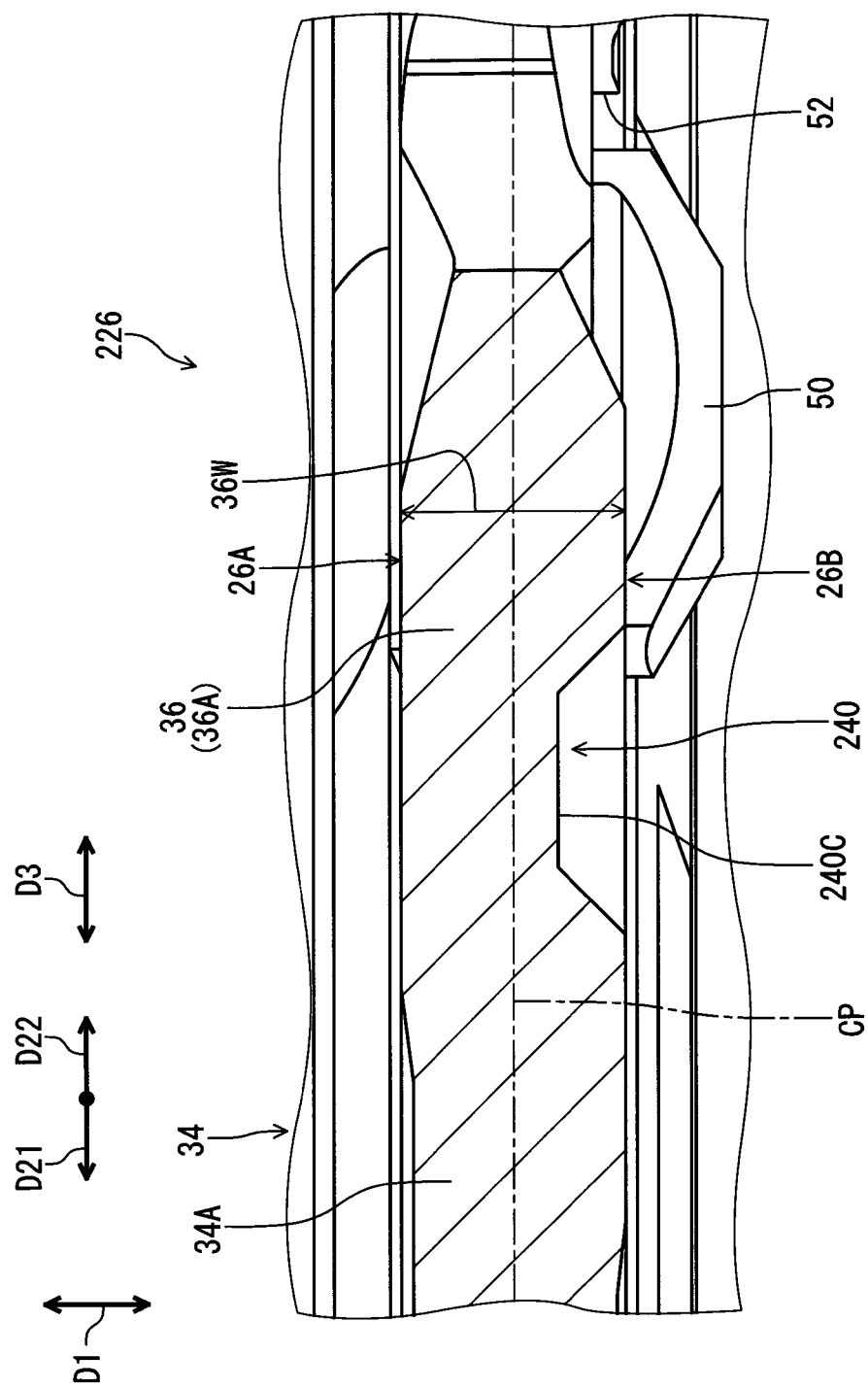
FIG. 21 is a cross-sectional view of the front sprocket assembly taken along line XXI-XXI of FIG. 19.

As seen in FIGS. 20 and 21, the less chain-interference recess 240 includes a bottom surface 240C. The bottom surface 240C is configured to face toward the transverse center plane TP of the vehicle body 2A in a mounting state where the front sprocket assembly 216 is mounted to the vehicle body 2A of the human-powered vehicle 2 (see e.g., FIG. 1).

The less chain-interference recess 240 is recessed from the second axially inwardly facing surface 26B toward the center plane CP in the axial direction D1. The bottom surface 240C is the closest to the center plane CP in the axial direction D1 in the less chain-interference recess 240.

As seen in FIG. 19, the bottom surface 240C extends along the longitudinal axis A52. The bottom surface 240C has a radially innermost bottom end 240E. A second radial distance DS22 is radially defined from the tooth bottom circle TC to the radially innermost bottom end 240E with respect to the rotational center axis A1. In other words, the second radial distance DS22 is defined from the tooth bottom circle TC to the radially innermost bottom end 240E along the radial direction with respect to the rotational center axis A1.

A reference point RT2 is an intersection point of a first reference line RL12 with the second reference line RL22 as viewed in the axial direction D1. The first reference line RL12 is perpendicular to the longitudinal axis A52 and connected with the reference center RC1 of the reference circle RC which is provided on an upstream side of the second sprocket tooth 36A in the driving rotational direction D21. The second reference line RL22 extends radially outwardly from the rotational center axis A1 through the radially innermost point 240D of the radially innermost end 240A.

In the present embodiment, the radially innermost bottom end 240E is provided on the reference point RT2 as viewed in the axial direction D1. However, the radially innermost bottom end 240E can be offset from the reference point RT2 as viewed in the axial direction D1 if needed and/or desired.

A first reference angle AG12 is defined between the first reference line RL12 and the third reference line RL3 as viewed in the axial direction D1. A second reference angle AG22 is defined between the third reference line RL3 and the longitudinal axis A52 of the less chain-interference recess 240 as viewed in the axial direction D1. In the present embodiment, the first reference angle AG12 is equal to 30 degrees. The second reference angle AG22 is equal to 60 degrees. However, the first reference angle AG12 is not limited to the above angle. The second reference angle AG22 is not limited to the above angle.

The second radial distance DS22 is equal to or larger than 0.5 mm. The second radial distance DS22 is equal to or smaller than 2.0 mm. In the present embodiment, the second radial distance DS22 ranges from 0.7 mm to 0.9 mm. However, the second radial distance DS22 is not limited to the above distance and ranges.

The radially innermost end 240A of the less chain-interference recess 240 is at least partially positioned radially inwardly of the first reference line RL12. The radially innermost end 240A of the less chain-interference recess 240 is positioned radially inwardly of the reference point RT2.

The radially innermost end 240A of the less chain-interference recess 240 is at least partially positioned radially inwardly of the reference point RT2. In the present embodiment, the radially innermost end 240A of the less chain-interference recess 240 is partially positioned radially inwardly of the first reference line RL12. The radially innermost end 240A of the less chain-interference recess 240 is partially positioned radially inwardly of the reference point RT2. However, the radially innermost end 240A of the less chain-interference recess 240 can be entirely positioned radially inwardly of the first reference line RL12 if needed and/or desired. The radially innermost end 240A of the less chain-interference recess 240 can be entirely positioned radially inwardly of the reference point RT2 if needed and/or desired.

Figure 22:
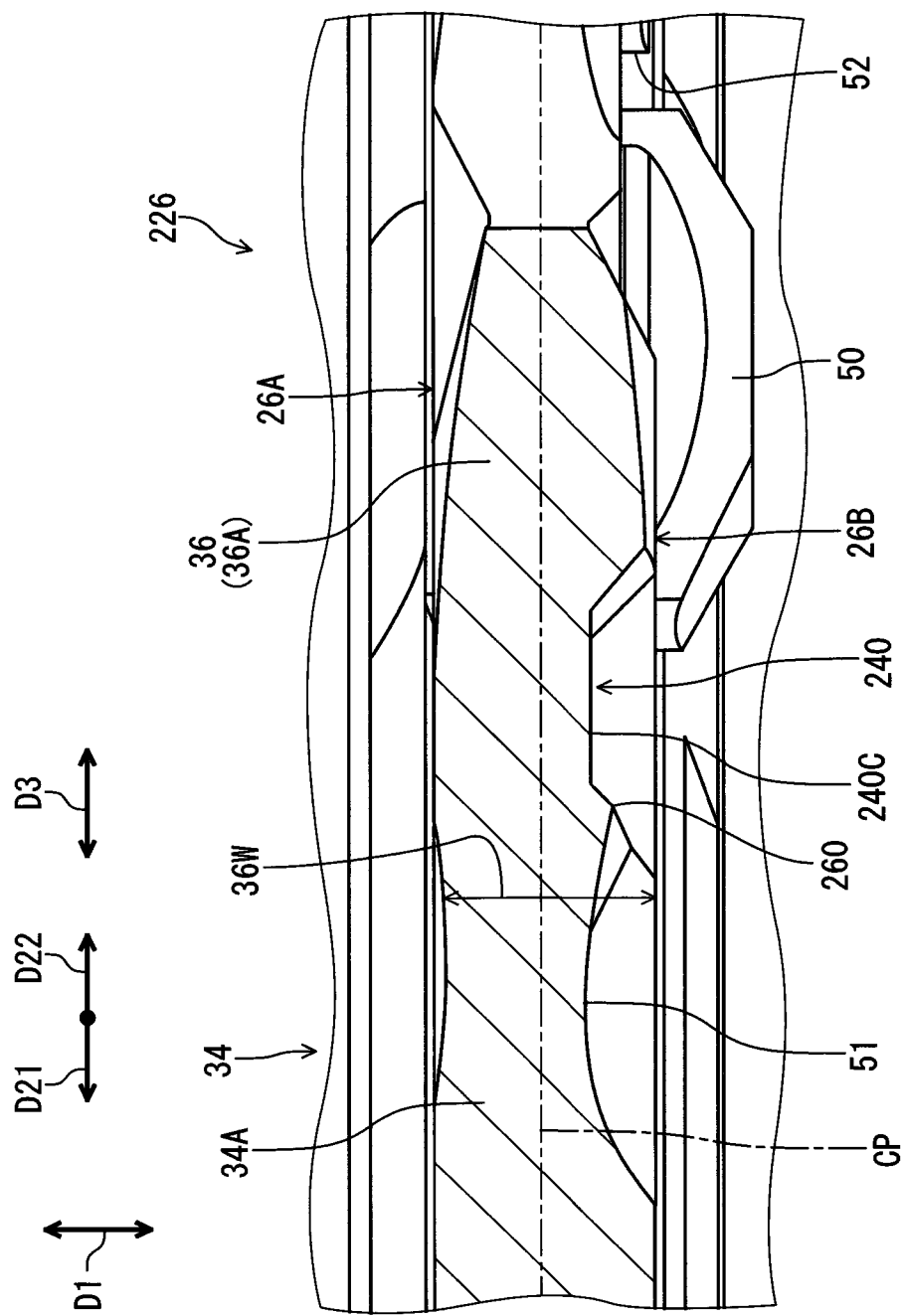
FIG. 22 is a cross-sectional view of the front sprocket assembly taken along line XXII-XXII of FIG. 19.

As seen in FIG. 22, the boundary 260 protrudes in the axial direction D2 to form the less chain-interference recess 240 and the inclined surface 51. The boundary 260 connects the less chain-interference recess 240 with the inclined surface 51. The boundary 260 is sharpened. However, the boundary 260 can have other shapes.

The less chain-interference recess 240 has the same advantageous effect as the advantageous effect of the less chain-interference recess 40 as discussed in the first embodiment referring to FIGS. 9 and 14 to 16. Thus, the description regarding the advantageous effect of the less chain-interference recess 40 in the first embodiment can apply to the advantageous effect of the less chain-interference recess 240 in the second embodiment. The advantageous effect of the less chain-interference recess 240 will not be described in detail here for the sake of brevity.

Modifications

In the first embodiment, as seen in FIG. 8, the inclined surface 51 is provided between the driving surface 42 and the less chain-interference recess 40. The less chain-interference recess 40 extends radially inwardly from the inclined surface 51 with respect to the rotational center axis A1. As with the less chain-interference recess 240 of the second embodiment, however, the less chain-interference recess 40 can be configured to extend radially inwardly from the driving surface 42 with respect to the rotational center axis A1 if needed and/or desired. Furthermore, as seen in FIG. 8, the less chain-interference recess 40 linearly extends in the elongated direction D5. As with the less chain-interference recess 240 of the second embodiment, however, the less chain-interference recess 40 can be configured to radially inwardly extend with respect to the rotational center axis A1 to have a curvature if needed and/or desired.

In the second embodiment, as seen in FIG. 19, the less chain-interference recess 240 extends radially inwardly from the driving surface 42 with respect to the rotational center axis A1. As with the less chain-interference recess 40 of the first embodiment, however, the inclined surface 51 can be provided between the driving surface 42 and the less chain-interference recess 240, and the less chain-interference recess 240 can be configured to extend radially inwardly from the inclined surface 51 with respect to the rotational center axis A1 if needed and/or desired. Furthermore, as seen in FIG. 19, the less chain-interference recess 240 radially inwardly extends with respect to the rotational center axis A1 to have a curvature. As with the less chain-interference recess 40 of the first embodiment, however, the less chain-interference recess 240 can be configured to linearly extend in the elongated direction D52 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A front sprocket assembly for a human-powered vehicle, the front sprocket assembly comprising:
    a first sprocket having a first axially outwardly facing surface and a first axially inwardly facing surface provided on a reverse side of the first axially outwardly facing surface in an axial direction with respect to a rotational center axis of the front sprocket assembly, the first sprocket including:
        a first sprocket body; and
        a plurality of first sprocket teeth extending radially outwardly from a first outer periphery of the first sprocket body with respect to the rotational center axis, the first sprocket having a first pitch circle diameter;
    a second sprocket having a second axially outwardly facing surface and a second axially inwardly facing surface provided on a reverse side of the second axially outwardly facing surface in the axial direction, the second axially inwardly facing surface being configured to face the first axially outwardly facing surface of the first sprocket in the axial direction in an assembled state of the front sprocket assembly, the second sprocket including:
        a second sprocket body; and
        a plurality of second sprocket teeth extending radially outwardly from a second outer periphery of the second sprocket body with respect to the rotational center axis, the second sprocket having a second pitch circle diameter larger than the first pitch circle diameter, the second sprocket being adjacent to the first sprocket without another sprocket between the first sprocket and the second sprocket in the axial direction;
    at least one tooth of the plurality of second sprocket teeth including a less chain-interference recess provided to the second axially inwardly facing surface, the less chain-interference recess being configured to reduce interference between the at least one tooth of the plurality of second sprocket teeth and a chain in an upshifting operation in which the chain is shifted from the first sprocket toward the second sprocket;
    the at least one tooth of the plurality of second sprocket teeth having a driving surface and a non-driving surface provided on a reverse side of the driving surface in a circumferential direction with respect to the rotational center axis;
    the less chain-interference recess extending radially inwardly with respect to the rotational center axis in an elongated direction inclining from the driving surface toward an upstream side with respect to a driving rotational direction of the front sprocket assembly;
    the less chain-interference recess having a radially innermost end positioned radially inwardly from a tooth bottom circle of the plurality of second sprocket teeth;
    the less chain-interference recess has a maximum transverse length and a maximum radial length;
    the maximum radial length is larger than the maximum transverse length; and
    the maximum radial length is in the elongated direction.

2. The rear sprocket assembly according to claim 1, wherein
    the first sprocket has a first total tooth number, and
    the second sprocket has a second total tooth number larger than the first total tooth number.

3. The rear sprocket assembly according to claim 2, wherein
    a tooth number difference between the first total tooth number and the second total tooth number is equal to or larger than nine.

4. The rear sprocket assembly according to claim 3, wherein
    the tooth number difference between the first total tooth number and the second total tooth number is equal to or smaller than 20.

5. The rear sprocket assembly according to claim 2, wherein
    the second total tooth number is equal to or larger than 50.

6. The rear sprocket assembly according to claim 1, further comprising:
    a shift assist projection at least a part of which is disposed radially inwardly from the non-driving surface of the at least one tooth of the plurality of second sprocket teeth with respect to the rotational center axis.

7. The rear sprocket assembly according to claim 6, wherein
    the radially innermost end of the less chain-interference recess is positioned at a downstream side from the shift assist projection with respect to the driving rotational direction of the front sprocket assembly.

8. The rear sprocket assembly according to claim 6, wherein
    the shift assist projection is disposed radially inwardly from the less chain-interference recess with respect to the rotational center axis.

9. The rear sprocket assembly according to claim 1, wherein
    the less chain-interference recess extends radially inwardly from the driving surface with respect to the rotational center axis to have a curvature.

10. The rear sprocket assembly according to claim 9, wherein
    the curvature of the less chain-interference recess is configured to correspond to a rotational locus of the chain.

11. The rear sprocket assembly according to claim 1, wherein the less chain-interference recess is configured to reduce interference between the at least one tooth of the plurality of second sprocket teeth and an outer link plate of the chain in the upshifting operation.

12. The rear sprocket assembly according to claim 1, wherein
at least two teeth of the plurality of second sprocket teeth each include the less chain-interference recess provided to the second axially inwardly facing surface.

13. The rear sprocket assembly according to claim 12, wherein
at least four teeth of the plurality of second sprocket teeth each include the less chain-interference recess provided to the second axially inwardly facing surface.

14. The rear sprocket assembly according to claim 1, wherein
a radial distance radially defined from the tooth bottom circle to the radially innermost end with respect to the rotational center axis being equal to or larger than 1.0 mm.

15. The front sprocket assembly according to claim 14, wherein
the radial distance is equal to or larger than 1.3 mm.

16. The rear sprocket assembly according to claim 14, wherein
the radial distance is equal to or smaller than 2.0 mm.

* * * * *